(12) United States Patent
Cha et al.

(10) Patent No.: US 6,779,902 B2
(45) Date of Patent: Aug. 24, 2004

(54) BACKLIGHT ASSEMBLY AND LIQUID CRYSTAL DISPLAY DEVICE HAVING THE SAME

(75) Inventors: Guy-Ho Cha, Gyeonggi-do (KR); Sung-Yong Kang, Suwon-si (KR); Se-In Chang, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 136 days.

(21) Appl. No.: 10/103,693

(22) Filed: Mar. 25, 2002

(65) Prior Publication Data

US 2002/0191387 A1 Dec. 19, 2002

(30) Foreign Application Priority Data

Mar. 26, 2001 (KR) .......................................... 2001-15670

(51) Int. Cl.⁷ ................................................. F21V 7/04
(52) U.S. Cl. ............................ 362/31; 362/27; 362/330
(58) Field of Search ............................... 362/26, 27, 31, 362/330, 339, 561, 558

(56) References Cited

U.S. PATENT DOCUMENTS

| | | | | |
|---|---|---|---|---|
| 5,711,592 A | * | 1/1998 | Hotta ............................ | 362/31 |
| 5,931,555 A | * | 8/1999 | Akahane et al. ............... | 362/31 |
| 6,048,071 A | * | 4/2000 | Sawayama ..................... | 362/31 |
| 6,124,906 A | * | 9/2000 | Kawada et al. ................ | 349/65 |
| 6,406,159 B1 | * | 6/2002 | Yamamoto ..................... | 362/31 |
| 6,568,821 B1 | * | 5/2003 | Page et al. ..................... | 362/31 |
| 2002/0080596 A1 | * | 6/2002 | Fukiharu ........................ | 362/31 |
| 2002/0181225 A1 | * | 12/2002 | Matsushita .................... | 362/31 |

* cited by examiner

Primary Examiner—Y. My Quach-Lee
Assistant Examiner—Peggy A. Neils
(74) Attorney, Agent, or Firm—McGuireWoods LLP

(57) ABSTRACT

There is disclosed a backlight assembly for maximizing a light incidence efficiency by changing a construction of a light guide plate and a liquid crystal display device having the same. A light incidence surface of the light guide plate receiving a light from a lamp is inclined to make an obtuse angle with a light-emitting surface through which the light is transferred to the display unit. An open surface of a lamp cover that is disposed to face towards the light incidence surface is formed to have the same inclined angle as the light incidence surface of the light guide plate. In addition, a light reflecting plate and an optical sheet are respectively disposed on the top and bottom surfaces of the light guide plate, on which light absorbing layers, for absorbing light that leaks from the light guide plate, are formed at both ends thereof. Accordingly, there are advantages in that the light incidence efficiency of the light is improved even though a thickness of the light guide plate is not increased, and that it is possible to remove the light concentrated at an edge of the light incidence surface of the light guide plate.

31 Claims, 21 Drawing Sheets

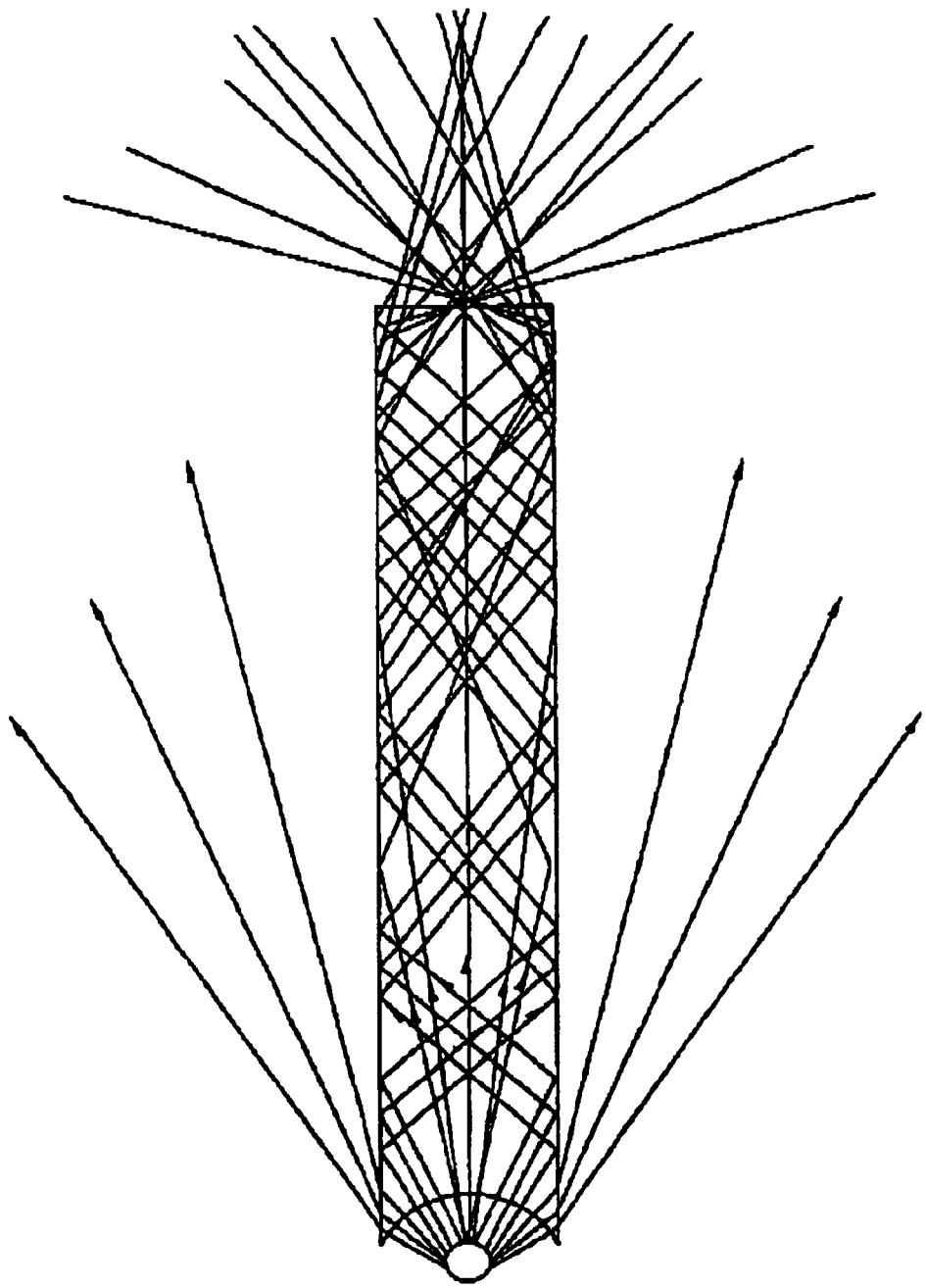

BACKLIGHT ASSEMBLY AND LIQUID CRYSTAL DISPLAY DEVICE HAVING THE SAME

BACKGROUND OF THE INVENTION

1. Field of the Invention

The present invention relates to a liquid crystal display device, and more particularly, to a back light assembly for maximizing a light incident efficiency by changing a structure of a light guide plate for guiding lights from a lamp to a display unit for displaying images and a liquid display device having the same.

2. Description of the Related Art

At the present time, information processing devices are rapidly developing with trends towards various architectures, functions and faster information processing speed. Information processed in these information processing devices has an electrical signal format. In order to visually confirm information processed in an information processing device, a display should be provided as an interface device. An example of such a display device is the liquid crystal display (LCD).

LCDs offer numerous advantages as display devices such as light weight, small size, high resolution, and low power consumption. They are also environmentally friendly and they offer a display of full colors compared with the traditional cathode ray tube (CRT). Such advantages allow the LCDs to replace the CRTs and to be recognized as a next generation display.

LCDs apply electric power to liquid crystal having a specific molecular configuration so as to vary the molecular arrangement of the liquid crystal. The variation in the molecular configuration of the liquid crystal causes a variation in optical properties such as birefringence, optical rotary power, dichroism and light scattering. The LCDs utilize such variations in optical properties to display an image.

In the LCD device, functions of a backlight assembly bring attention to a more important problem. The reason is that the backlight assembly affects both the mechanical and optical characteristics of the LCD device such that the size and the light efficiency of the LCD device undergo a change. This is discussed, along with a description of prior art systems, in conjunction with FIGS. 1–3 below.

FIG. 1 is an exploded perspective view schematically showing the LCD device according to the conventional art schematically. FIG. 2 is a sectional view schematically showing the constructions of a lamp unit and a light guide unit in the backlight assembly as shown in FIG. 1. FIG. 3 is a view showing a pathway of the light in the light guide plate shown in FIG. 2.

Referring first to FIG. 1, the LCD device 900 has a LCD module 700 for displaying images when image signals are applied thereto and a case (not shown) for receiving the LCD module 700. The LCD module 700 includes a display unit 710 having a LCD panel for showing the images.

The display unit 710 includes the LCD panel 712, a data-side printed circuit board (PCB) 714, a gate-side PCB 717, a data-side tape carrier package 716 and a gate-side tape carrier package 718.

The LCD panel 712 includes a thin film transistor substrate 712a, a color filter substrate 712b and liquid crystal (not shown) between the thin film transistor substrate 712a and the color filter substrate 712b.

The thin film transistor substrate 712a is a transparent glass on which the thin film transistors are formed in a matrix form. Data lines are respectively connected with source terminals of the thin film transistors and gate lines are connected with gate terminals of the thin film transistors. Furthermore, pixel electrodes are respectively formed at drain terminals of the thin film transistors, which are made of a transparent conductive material such as Indium Tin Oxide (ITO).

The color filter substrate 712b is provided to face the thin film transistor substrate 712a. RGB pixels are formed on the color filter substrate 712b by means of a thin film process, which presents a predetermined color while the light passes through the color filter substrate 712b. Common electrodes made of the ITO are coated on the front surface of the color filter substrate 712b.

When the thin film transistors of the thin film transistor substrate 712a are turned on, an electric field is created between the pixel electrodes of the thin film transistor substrate 712a and the common electrodes of the color filter substrate 712b. The electric field causes the liquid crystal to change the array angle, which results in the permeability of the light being changed. As a result, the desired pixels are obtained.

A driving signal and a timing signal are applied to the gate lines and data lines of the thin film transistor in order to control the array angle of the liquid crystal and the time of arraying the liquid crystal in the LCD panel 712. A source part for providing the data driving signal to the LCD panel 712 is formed on the data-side PCB 714, and a gate part for providing the gate driving signal to the gate lines is formed on the gate-side PCB 717. In other words, the PCBs 714 and 717 generate and apply the gate driving signal and the data signal for driving the LCD device as well as a plurality of timing signals for applying the gate driving signal and the data signal to the gate lines and the data lines of the LCD panel 712.

Continuing with FIG. 1, the backlight assembly 720 is provided under the display unit 710 so as to uniformly supply the light to the display unit 710. The backlight assembly 720 includes a lamp 721 for generating the light. The lamp 721 is protected by means of a lamp cover 722.

The light guide plate 724 has a size corresponding to that of the liquid crystal panel 712 of the display unit 710, which is disposed under the liquid crystal panel 712 to guide the light emitted by the lamp 721 toward the display unit 710 by changing a pathway of the light.

A plurality of optical sheets is provided on the light guide plate 724 so as to uniformly adjust the brightness of the light that transmitted from the light guide plate 724 to the LCD panel 712. In addition, a light reflecting plate 728 is provided under the light guide plate 724 to reflect the light, which is leaked from the light guide plate 724, towards the light guide plate 728 so as to improve the efficiency of the light.

The display unit 710 and the backlight assembly 720 are supported by means fo a mold frame 820 used as a receptacle. The mold frame 820 is provided with a chassis 810 for preventing the display unit 710 from departing from the mold frame 820 while the data-side PCB 714 and the gate-side PCB 7171 are bent towards the outside of the mold frame 820 and are fixed to the bottom surface of the mold frame 820.

Referring now to FIG. 2, the light guide plate 724 is of an edge-type having a uniform thickness, and a lamp 721 for supplying the light is provided at an end of the light guide plate 724. Typically, the light emitted from the lamp 721 of the edge-type light guide plate 724 is transmitted through a pathway as shown in FIG. 3.

As shown in FIG. 3, the light emitted from the lamp 721 is transmitted to the top and bottom surfaces 724a and 724b of the light guide plate 724 according to the incidence angle thereof. A part of the light transmitted to the top surface 724a of the light guide plate 724 is provided to the display unit 710 after passing through the top surface 724a of the light guide plate 724, while the remainder of the light is reflected at the bottom surface 724b of the light guide plate 724 and then transmitted toward the top surface 724a of the light guide plate 724.

Meanwhile, the light transmitted to the bottom surface 724b of the light guide plate 724 is reflected by means of printed patterns (not shown) that are formed on the bottom surface 724b of the light guide plate 724, and then the light passes through the top surface 724a of the light guide plate 724. Ultimately, the light is provided to the display unit 710. At this time, a part of the light transmitted to the bottom surface 724b of the light guide plate 724 passes through the bottom surface 724b and leaks out of the light guide plate 724. However, the leaked light is reflected to the display unit 710 by means of the light reflecting plate 728 that is disposed between the light guide plate 724 and the mold frame 820 (see FIG. 1).

With relation to the light guide plate 724, the brightness of the light that is supplied to the display unit 710 increases in proportion to the thickness of the light guide plate 724. Accordingly, a method of increasing the thickness of the light guide plate 724 can be adopted to maximize the incidence efficiency of the light. When the thickness of the light guide plate 724 increases, however, there is a problem in that the LCD device becomes heavier and has an increased thickness.

SUMMARY OF THE INVENTION

The present invention has been made to solve the above-mentioned problem, and accordingly it is an object of the present invention to provide a backlight assembly for maximizing a light incidence efficiency by changing a construction of a light guide plate for guiding lights from a lamp to a display unit for displaying images.

It is another object of the present invention to provide a liquid crystal display (LCD) device having a backlight assembly for maximizing a light incidence efficiency.

To achieve the first object of the present invention, a backlight assembly according to the present invention has a light guiding unit that guides light provided through a light incidence surface to a display unit in order to display images, the light incidence surface being formed to make an obtuse angle with a light-emitting surface through which the light is emitted to the display unit. A light emitting unit is disposed on the light incidence surface of the light guiding unit to emit and provide the light through the light incidence surface to the light guiding unit.

To achieve the second object of the present invention, a LCD device according to the present invention has a display unit for displaying images and a light guiding unit, the light incidence surface is formed to make an obtuse angle with a light-emitting surface through which the light is emitted to the display unit for guiding light provided through the light incidence surface to the display unit. A light emitting unit is mounted on the light incidence surface of the light guiding unit to emit and provide the light through the light incidence surface to the light guiding unit, and a light reflecting unit is disposed on the bottom surface of the light guiding unit to reflect the light, which leaks from the light guiding unit, toward the display unit.

Meanwhile, the light emitting unit includes at least one lamp for emitting the light and a lamp cover for covering and protecting the lamp. The lamp cover is mounted on the light incidence surface of the light guiding unit, which has an open side in order that the light emitted from the lamp is transmitted through the open side to the light guiding unit. The open side of the lamp cover is declined at an inclination angle equal to an inclination angle of the light incidence surface or formed to be parallel with a backside opposite to the open side thereof. The light incidence surface has a length as 1.2 to 1.8 times as that of the outer diameter of the lamp.

Furthermore, a printed pattern is formed on a bottom surface of the light guiding unit to reflect the light transmitted from the lamp toward the display unit. This pattern has a higher density according as the printed pattern is located farther away from the light incidence surface of the light guiding means A light reflecting plate and an optical sheet, on which a light absorbing layer is formed to absorb the light leaked from the light guiding unit, are mounted on the top and the bottom surfaces of the light guiding unit. In a preferred embodiment, a diffusion plate for diffusing the light, or a prism for concentrating the light, is used as the optical sheet. A length of a shortest distance from an apex of the obtuse corner of the light incidence surface to the bottom surface of the light guiding unit is substantially equal to a diameter of the lamp.

In the backlight assembly and the LCD device according to the present invention, as the light incidence surface of the light guide plate is declined at the obtuse angle with the top surface of the light guide plate, the light incidence efficiency can be improved even though the thickness of the light guide plate is not increased.

In addition, it is possible to absorb and remove the light concentrated at a corner portion of the light incidence surface of the light guide plate by means of the light absorbing layer formed on a predetermined portion of the light reflecting plate, the light diffusing plate and/or the light guide plate.

BRIEF DESCRIPTION OF THE DRAWINGS

The above objects and other advantages of the present invention will become more apparent by describing in detail preferred embodiments thereof with reference to the attached drawings, in which:

FIGS. 18A to 18E are views showing light guide plates according to the present invention, in which the light guide plates having a different structure from one another respectively provide pathways for the light.

DETAILED DESCRIPTION OF THE PREFERRED EMBODIMENT

Hereinafter, preferred embodiments of the present invention will be explained in detail with reference to the attached drawings.

Figure 1:
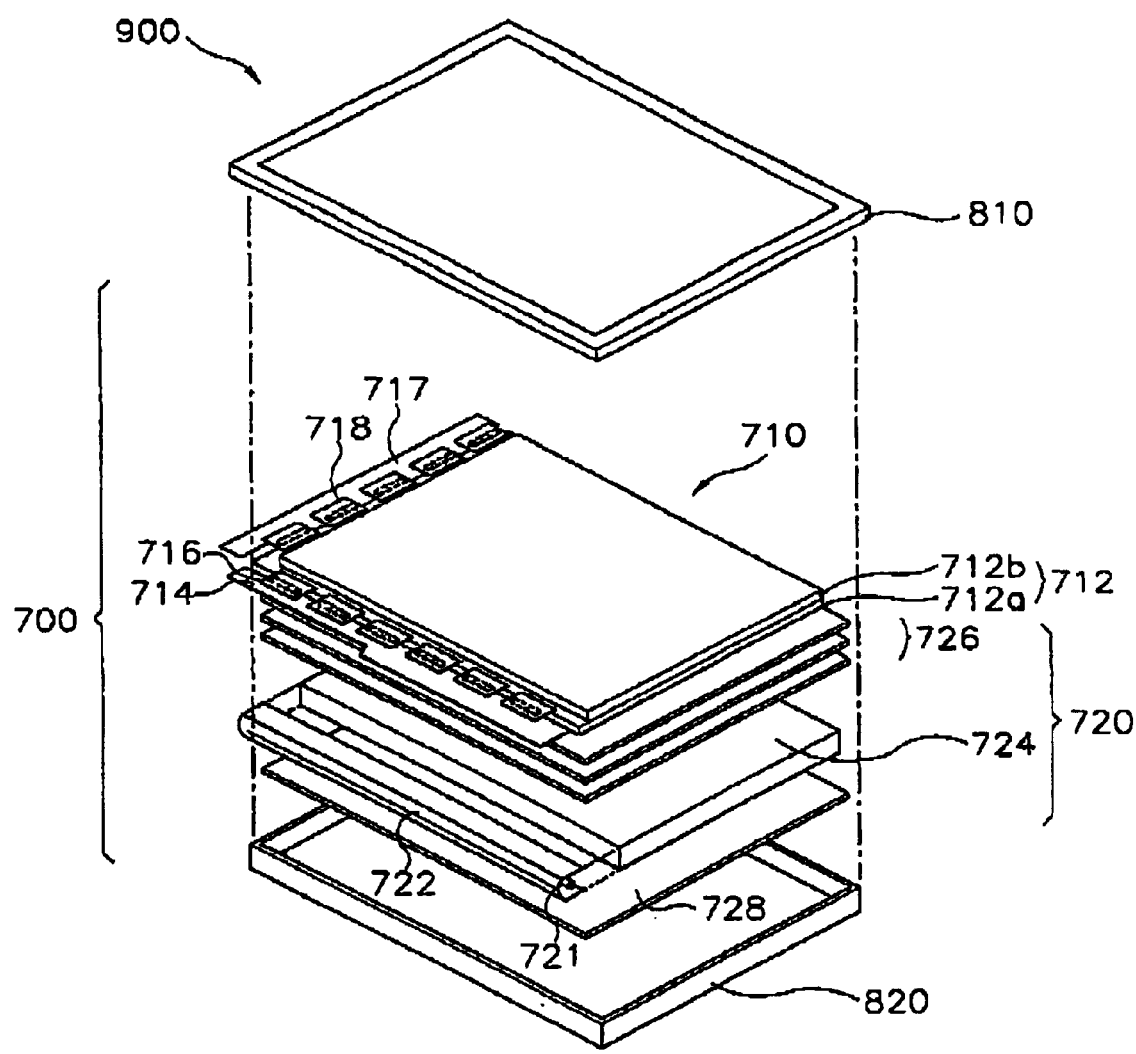
FIG. 1 is an exploded perspective view schematically showing a conventional liquid crystal display device.
Figure 2:
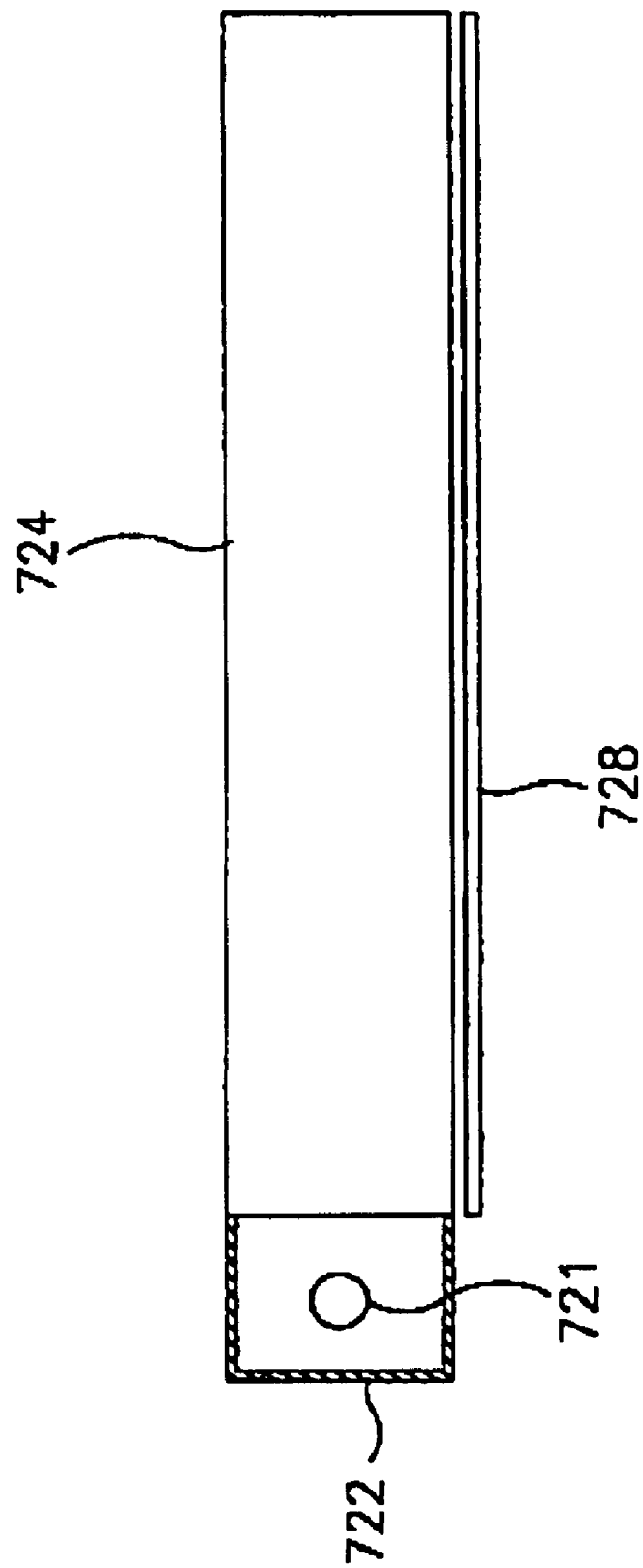
FIG. 2 is a sectional view showing the structures of a lamp unit and a light guide unit of a backlight assembly as shown in FIG. 1.
Figure 3:
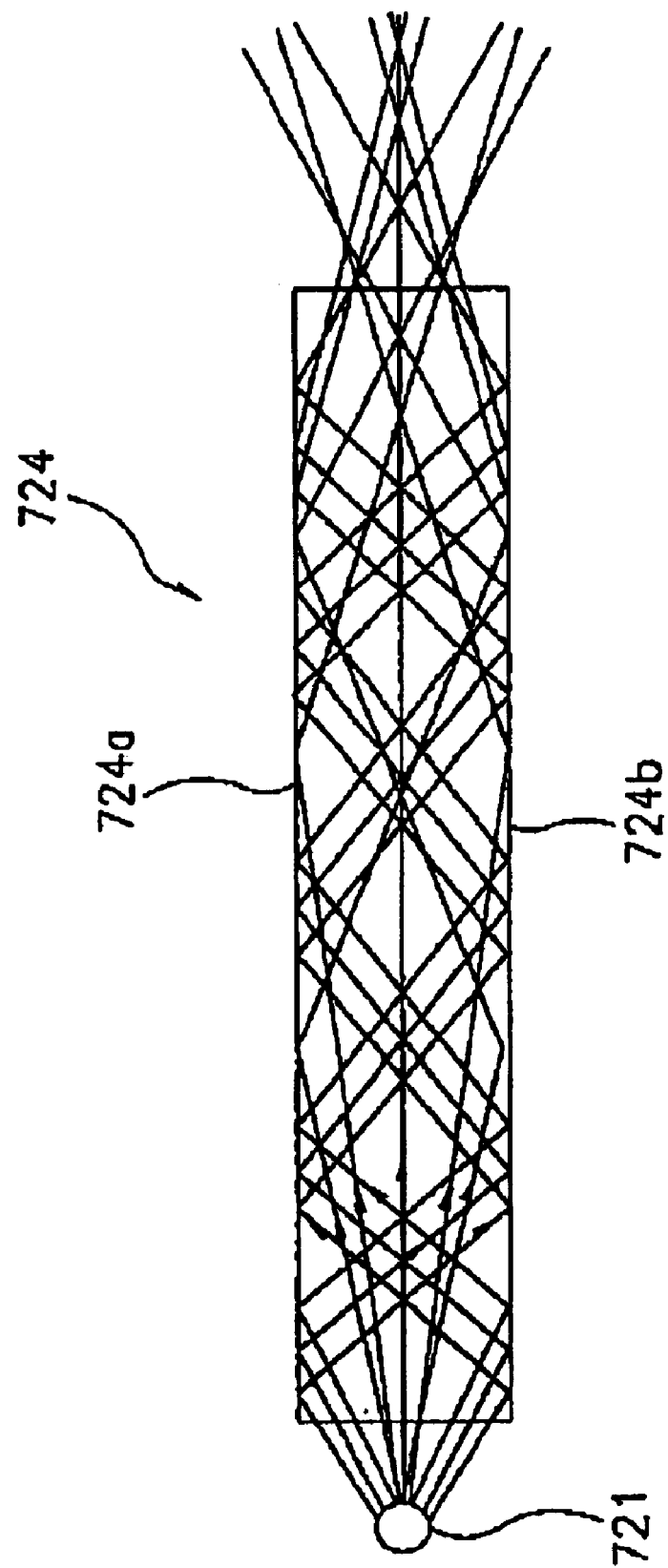
FIG. 3 is a view showing a light guide pathway of the light guide unit shown in FIG. 2.
Figure 4:
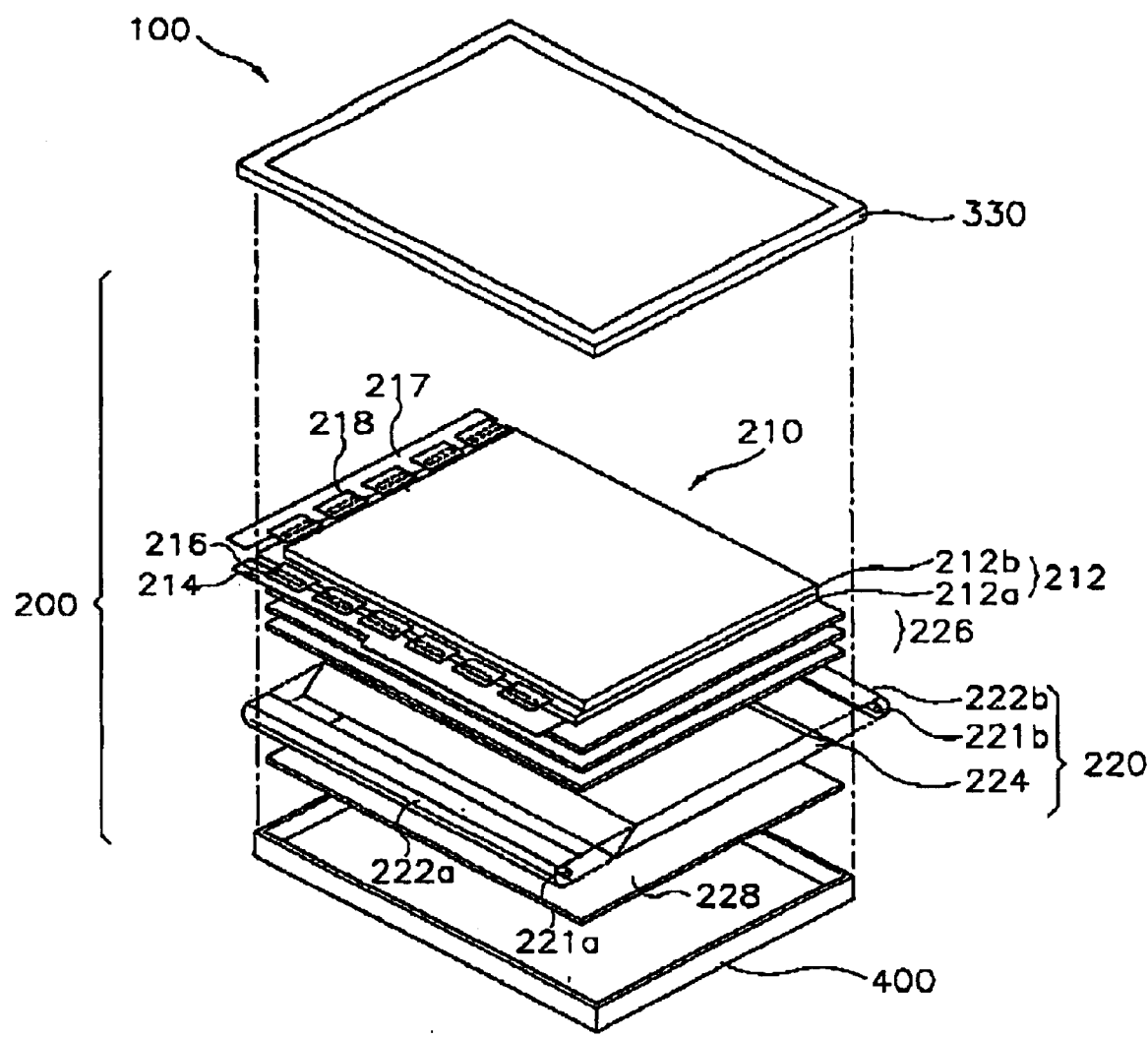
FIG. 4 is an exploded perspective view schematically showing a liquid crystal display device according to a preferred embodiment of the present invention.

FIG. 4 is an exploded perspective view schematically showing a liquid crystal display device according to a preferred embodiment of the present invention.

Referring first to FIG. 4, the liquid crystal display (LCD) device 100 includes a LCD module 200, for displaying images when image signals are applied to the LCD module 200, as well as front and rear cases (not shown) for receiving the LCD module 200.

The LCD module 200 includes a display unit 210 having a LCD panel 212 for displaying the images.

The display unit 210 includes a LCD panel 212, a data-side PCB 214, a data-side tape carrier package 216, a gate-side PCB 217 and a gate-side tape carrier package 218.

The LCD panel 212 has a thin film transistor substrate 212a, a color filter substrate 212b and a liquid crystal (not shown) between the thin film transistor substrate 212a and the color filter substrate 212b.

The thin film transistor substrate 212a is a transparent glass substrate on which thin film transistors in matrix are formed. A data line is connected with a source terminal of the thin film transistors and a gate line is connected with a gate terminal of the thin film transistors. Furthermore, pixel electrodes made of ITO as a transparent and conductive material are formed in a drain terminal of the thin film transistors.

When electric signals are applied to the data line and to the gate line, the electric signals are inputted into the source terminal and the gate terminal of the respective thin film transistors. As the electric signals are inputted to the thin film transistors, the thin film transistors are respectively turned-on or turned-off, resulting in outputting the electric signals that is required to form pixels to the drain terminals.

The color filter substrate 212b is provided to face to the thin film transistor substrate 212a. The color filter substrate 212b has RGB pixels that are formed by a thin film process to present desired colors while the light is passing through the color filter substrate 212b. A surface of the color filter substrate 212b is covered with common electrodes made of ITO.

As described above, when the electricity is applied to the gate and source terminals of the transistor on the thin film transistor substrate 212a to turn on the thin film transistor, an electric field is formed between the pixel electrodes and common electrodes of the color filter substrate 212b. The arranging angle of the liquid crystal injected between the thin film transistor substrate 212a and the color filter substrate 214b is changed by the electric field, and a light penetrating degree is changed as the arranging angle is changed so as to produce a wanted pixel.

In order to control the time at which the arranging angle of the liquid crystal of the LCD panel 212, a driving signal and a timing signal are applied to the gate line and to the data line of the thin film transistor.

As shown in FIG. 4, the data-side tape carrier package 216, which is a flexible circuit board, is attached to the source portion of the LCD panel 212 to decide a time of applying a data driving signal. On the other hand, the gate-side tape carrier package 218 is attached to the gate portion of the LCD panel 212 to decide a time of applying a gate-driving signal.

The data-side PCB 214 and the gate-side PCB 217, which respectively apply the driving signal to the gate line and to the data line as soon as they receive image signals input from outside of the LCD panel 212, make contact with the data-side tape carrier package 216 for the data line and the gate-side tape carrier package 218 for the gate line in the LCD panel 212, respectively. A source part is formed on the data-side PCB 214, which receives the image signals from an exterior information processing device (not shown) such as a computer, and then provides the data driving signal to the LCD panel 212. Also, a gate part is formed on the gate-side PCB 217, which receives the image signals, and provides the gate driving signal to the gate line of the LCD panel 212.

In other words, the data-side PCB 214 and the gate-side PCB 217 generate the data driving signal and the gate signal for driving the LCD device and the plural timing signals for applying the gate driving signal and the data signal in an acceptable time, so as to apply the gate driving signal through the gate-side tape carrier package 218 to the gate line of the LCD panel 212 and the data signal through the data-side tape carrier package 216 to the data line of the LCD panel 212.

A backlight assembly 220 is disposed under the display unit 210 so as to uniformly supply the light to the display unit 210. The backlight assembly 220 includes first and second lamps 221a and 221b for generating the light. The first and second lamps 221a and 221b are respectively covered with first and second lamp covers 222a and 222b. Furthermore, the backlight assembly 220 may have at least one lamp providing the light. Further details relating to the lamps will be described hereinafter.

A light guide plate 224 has a size corresponding to that of the LCD panel 212 of the display unit 210 and is disposed under the LCD panel 212 so as to guide the light generated by the first and second lamps 221a and 221b towards the display unit 210 while changing the pathway of the light. In FIG. 4, the light guide plate 224 is depicted as an edge-type plate having a uniform thickness along its length excepting for both ends. The first and second lamps 221a and 221b are mounted at both ends of the light guide plate 224 to increase a light efficiency.

In addition, both ends of the light guide plate 224 are respectively formed in that a light incidence surface through which the light from the first and second lamps 221a and 221b is formed to be at an obtuse angle with a light-emitting surface (i.e., the top surface). The light guide plate 224 will be described in detail below with reference to the drawings.

Meanwhile, a plurality of optical sheets is disposed on the light guide plate 224 so that a brightness of the light emitted from the light guide plate 224 to the LCD panel 212 may be uniformly formed. Furthermore, a light reflecting plate 228 is provided under the light guide plate 224 in order to reflect the leaked light to the light guide plate 224, resulting in increased light efficiency.

The display unit 210 and the backlight assembly 220 are supported and fixed by means of a mold frame 400 that is used as a receptacle. A chassis 330 for preventing the display unit 210 from departing from the mold frame 400 is provided above the display unit 210 while the data-side PCB 214 and the gate-side PCB 217 are bent towards the outside of the mold frame 400 and are fixed to the bottom surface of the mold frame 400.

Figure 5:
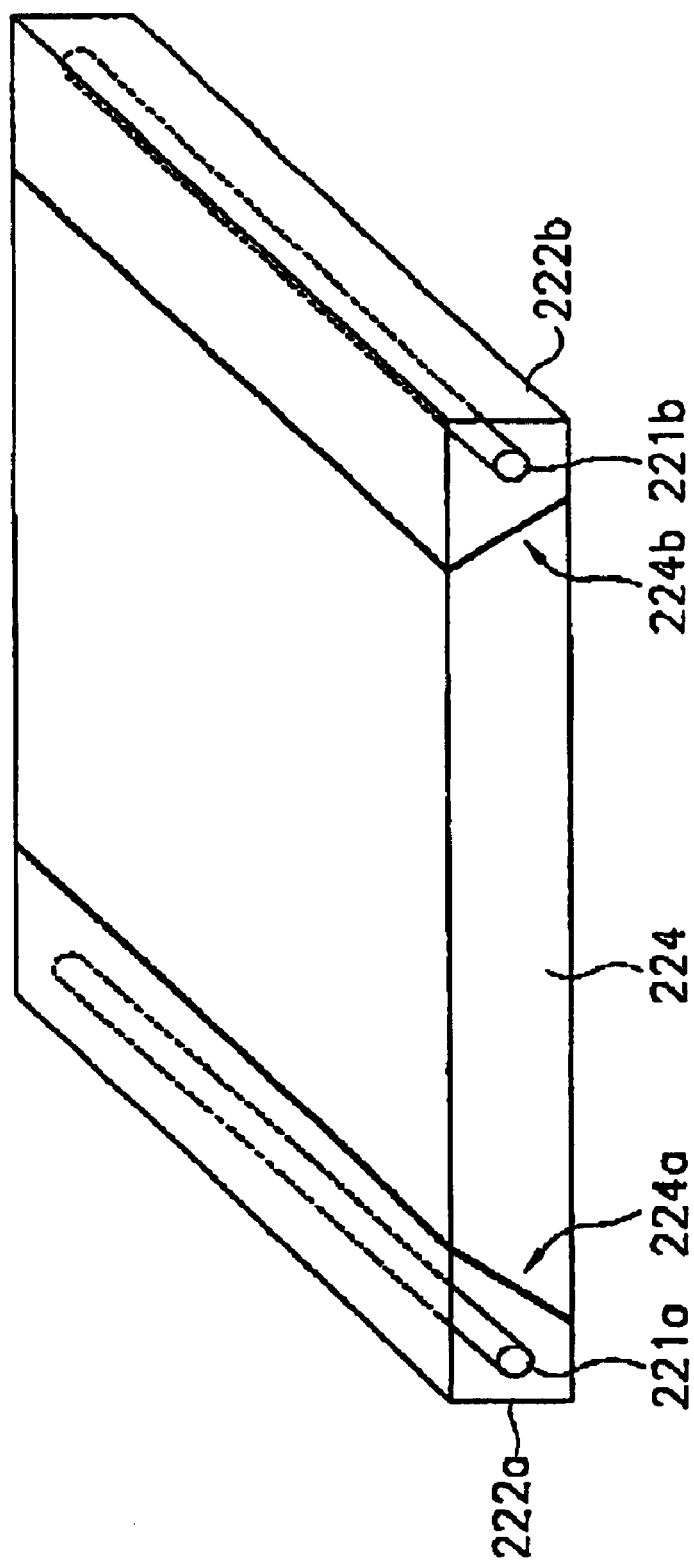
FIGS. 5 and 6 are views showing constructions of the lamp unit and the light guide unit of the backlight assembly shown in FIG. 4.
Figure 6:
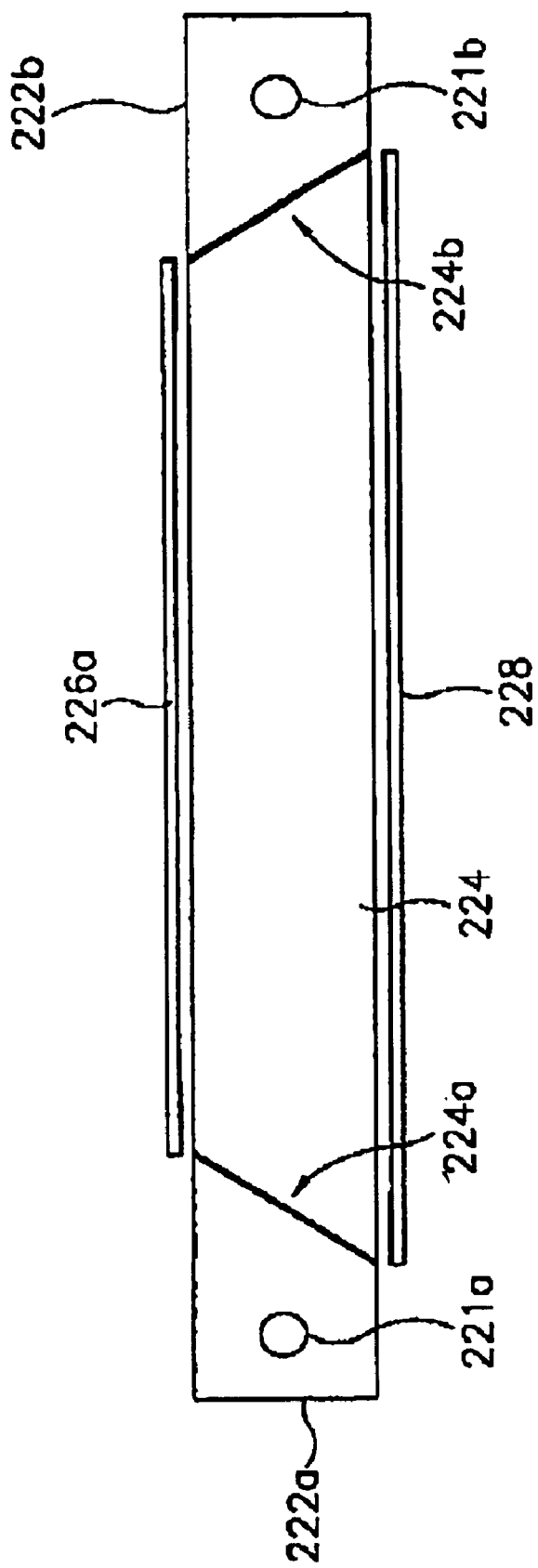

FIG. 5 is a view for showing constructions of the lamp unit and the light guide plate of the backlight assembly shown in FIG. 4, and FIG. 6 is a view for showing a construction of the light guide plate in FIG. 5, on which the optical sheet and the light reflecting plate are mounted.

Referring now to FIGS. 5 and 6, the first and second light incidence surfaces 224a and 224b of the light guide plate 224, through which the light is inputted from the first and second lamp 221a and 221b, are declined so that apexes of both ends of the light guide plate 224 respectively are made at obtuse angle. In other words, the light guide plate 224 disposed between the first and second lamps 221a and 221b has a shorter length on the top surface than that of the bottom surface thereof.

Similarly, the first and second lamp covers 222a and 222b, which protect the first and second lamps 221a and 221b and reflect the light from the first and second lamps 221a and 221b to the first and second light incidence surfaces 224a and 224b of the light guide plate, have a construction in that an open surface facing to the first and second light incidence surfaces 224a and 224b is not matched with a light reflecting surface opposite thereto. That is, the open surfaces of the first and second lamp covers 222a and 222b contacting to the first and second light incidence surfaces 224a and 224b are respectively declined to be in parallel with the first and second light incidence surfaces 224a and 224b. The light reflecting surfaces facing to the open surfaces of the first and second lamp covers 222a and 222b, to reflect the light emitted from the first and second lamps 221a and 221b to the light guide plate 224, intersect the top and bottom surfaces of the light guide plate 224. To the contrary, the top surfaces of the first and second lamp covers 222a and 222b, respectively covering the first and second lamps 221a and 221b, have a wider width than that of the bottom surfaces thereof.

Figure 7:
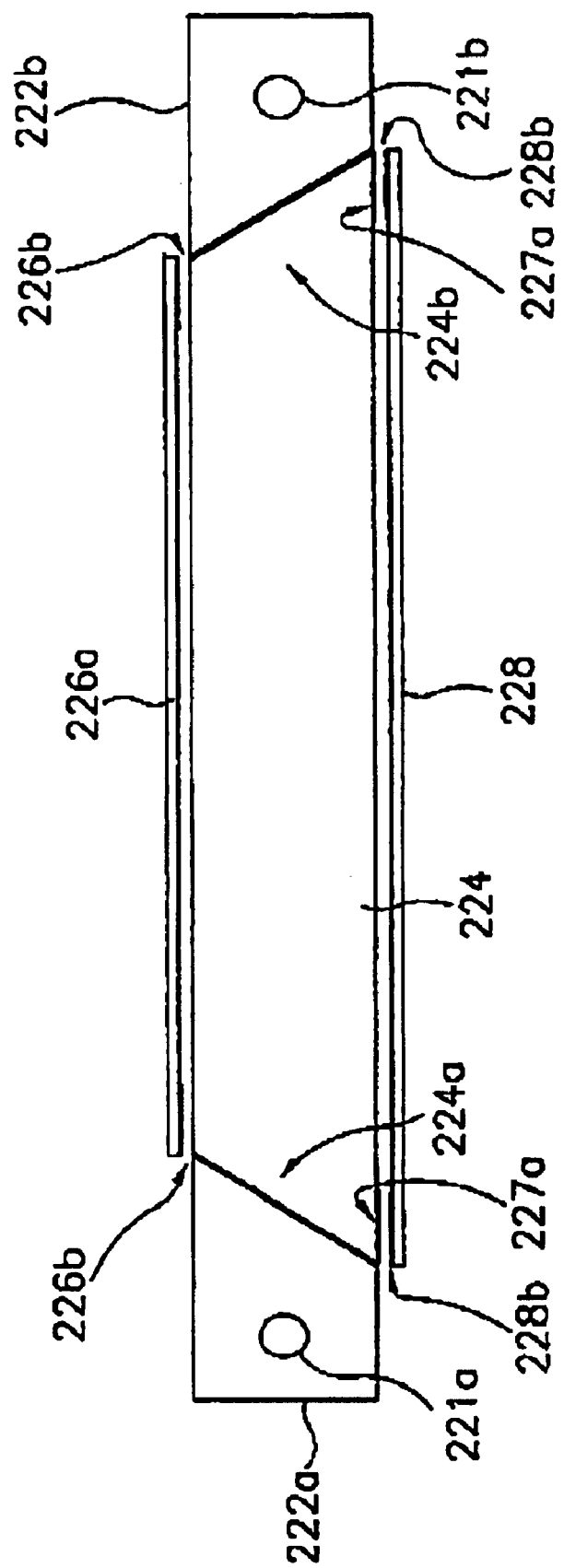
FIG. 7 is a view showing the constructions of the lamp and the light guide plate of the backlight assembly particularly shown in FIG. 6.

FIG. 7 is a view for showing the structures of the lamp and the light guide plate of the backlight assembly particularly shown in FIG. 6.

Referring now to FIG. 7, the light reflecting plate 228 is disposed under the light guide plate 224, and the optical sheet 226a, such as a diffusion plate or a prism, is mounted on the light guide plate 224. The light reflecting plate 228 basically carries out reflecting the light leaked from the light guide plate 224 while the optical sheet 226a diffuses or concentrates the light emitted from the light guide plate 224. That is, in the case that a diffusion sheet is used as the optical sheet 226a, the sheet can scatter and diffuse the light emitted from the light guide plate 224, while, on the other hand, in the case that a prism sheet is used as the optical sheet 226a, the sheet can concentrate the light emitted from the light guide plate 224 to improve the brightness of the light at a front of the LCD panel.

A light absorbing layer is formed at both ends of each light reflecting plate 228 and optical sheet 226a, i.e., at portions adjacent to the first and second light incidence surface 224a and 224b of the light guide plate 224 so as to absorb the light from the light guide plate 224, as shown in FIGS. 7 to 11.

Figure 8:
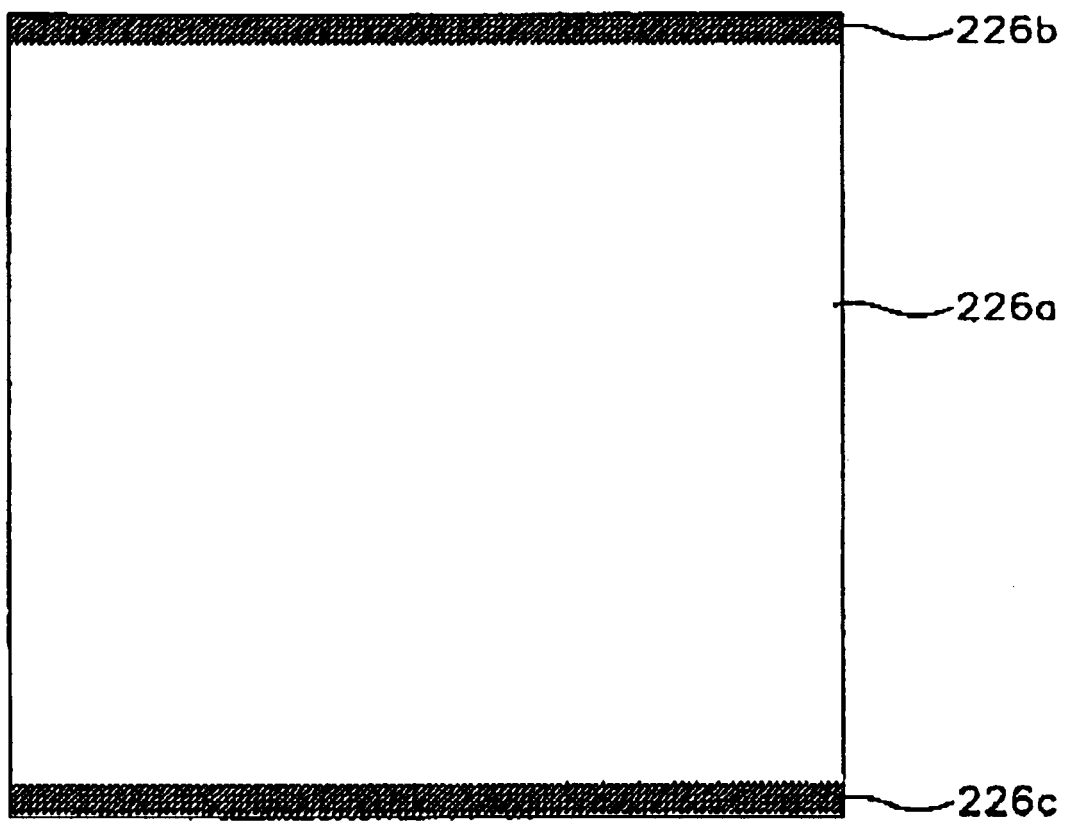
FIGS. 8 and 9 are views showing a light diffusing plate and a light reflecting plate of the light guide unit shown in FIG. 6.
Figure 9:
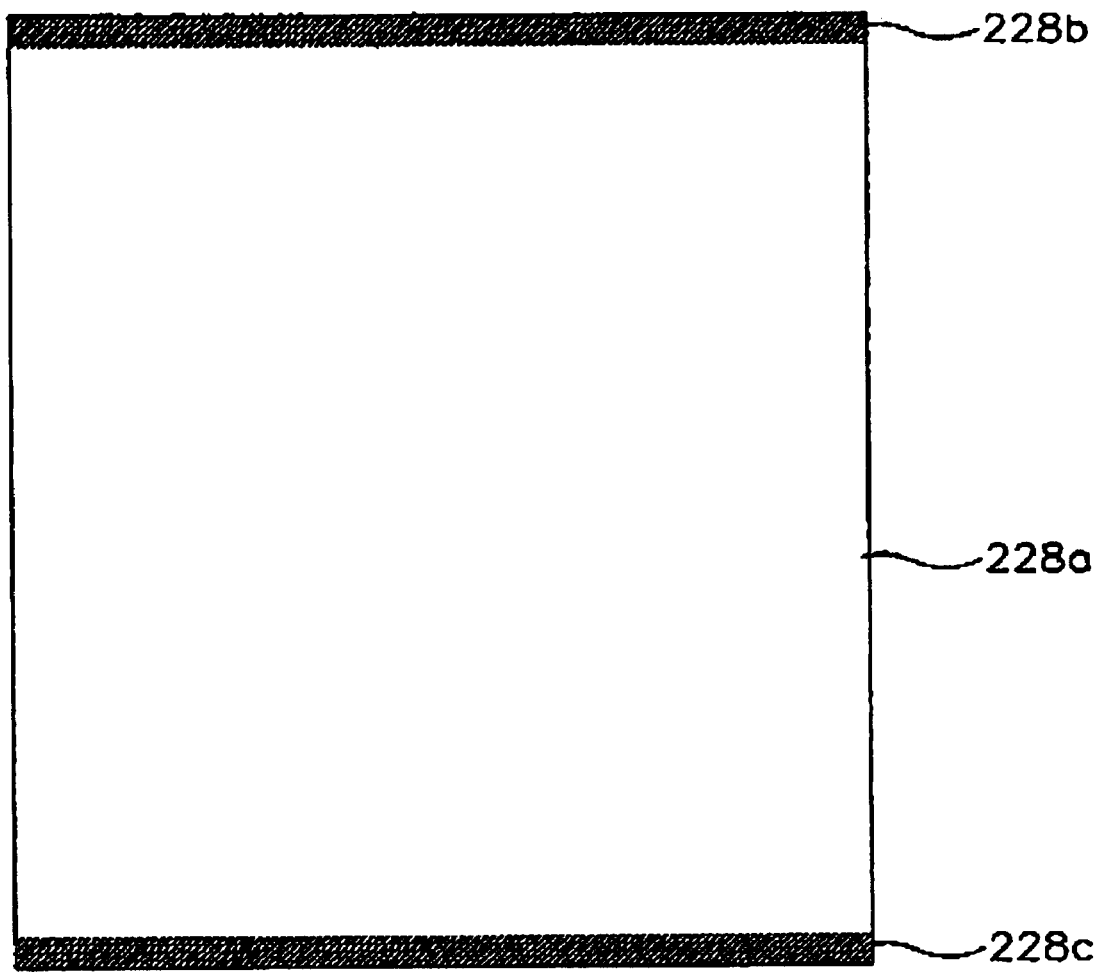

FIG. 7 is a view showing the structures of the lamp and the light guide plate of the backlight assembly particularly shown in FIG. 6, and FIGS. 8 and 9 are views showing the optical sheet and the light reflecting plate of the light guide unit shown in FIG. 6. Also, FIG. 10 is a view showing a printed pattern of the light guide plate shown in FIG. 6, and FIG. 11 is a view showing the printed pattern and the light absorbing layer of the light guide plate shown in FIG. 6.

Generally, without relation to a construction of ends of the light guide plate 224, there is presented an appearance in that the light is concentrated at a corner portion of the light guide plate 224 in an edge-type LCD device. To prevent the light from concentrating, it is preferred to quickly leak and remove the concentrated light at the corner portion of the light guide plate 224. The light absorbing layers 228a, 228b, 226b, 226c, 227a and 227b are formed to absorb the light at both ends of any one of the light reflecting plate 228, the optical sheet 226a and the light guide plate 224 (i.e., at portions adjacent to the first and second light incidence surfaces 224a and 224b, as shown in FIGS. 8 and 9).

Figure 10:
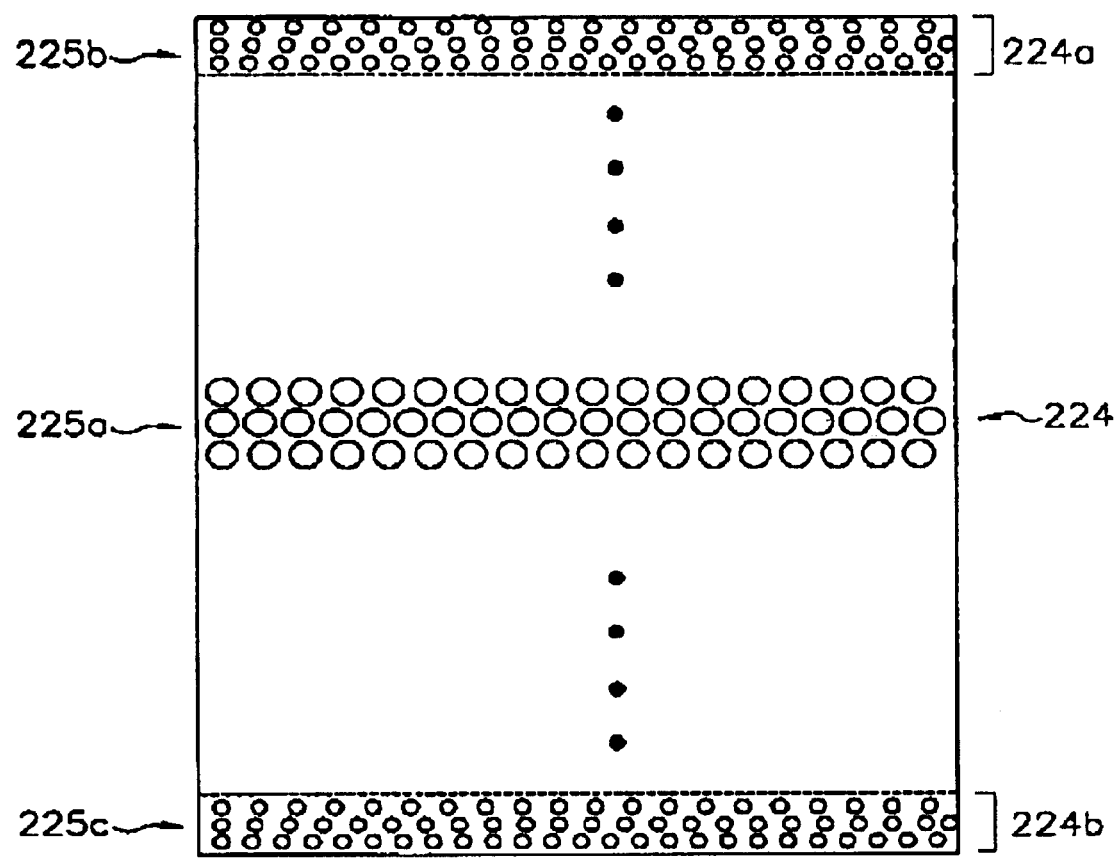
FIG. 10 is a view showing a printed pattern of the light guide plate shown in FIG. 6.
Figure 11:
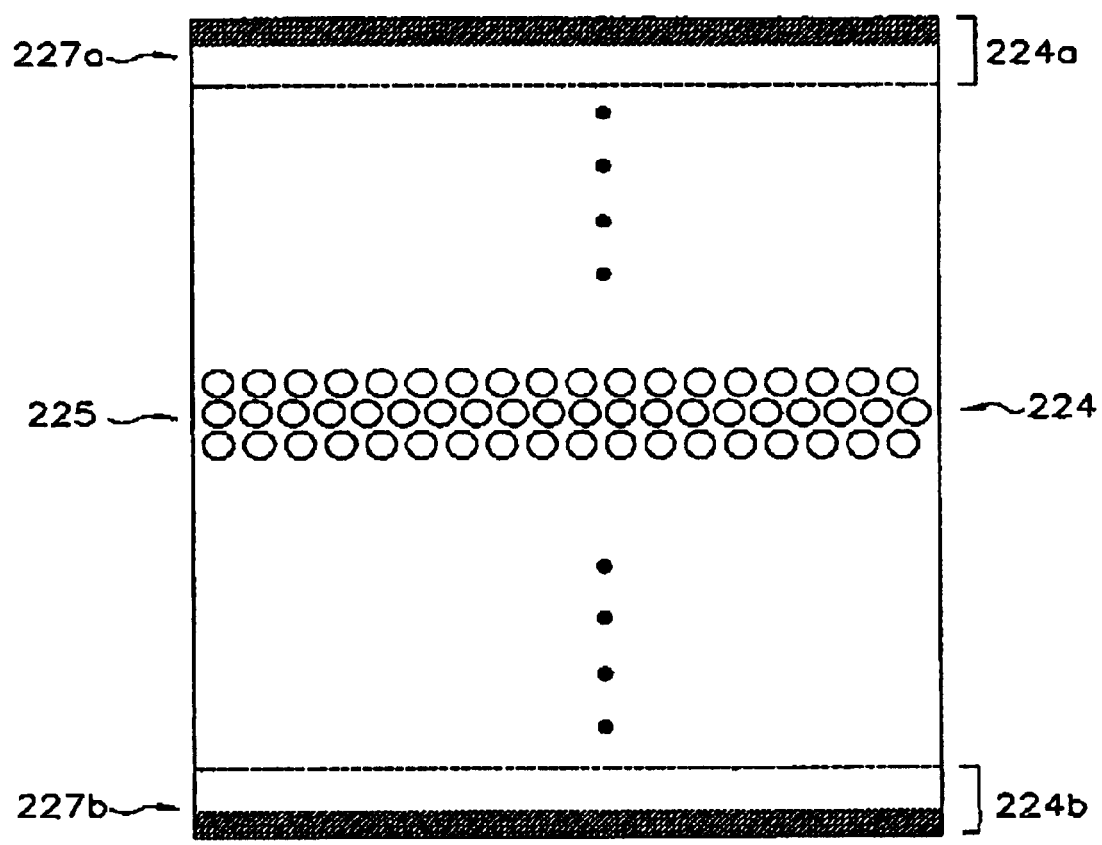
FIG. 11 is a view showing the printed pattern and an absorbing layer of the light guide plate shown in FIG. 6.

Meanwhile, fine printed patterns 225a, 225b and 225c, as shown in FIG. 10, are formed on the bottom surface of the light guide plate 224 to reflect the light provided by the first and second lamps 221a and 221b to the display unit 210, thereby resulting in increasing the reflection efficiency.

The printed patterns 225a, 225b and 225c are formed to be gradually much more dense from the both end portions to a center portion of the light guide plate 224. That is, a space between the printed patterns 225b and 225c is gradually wider as the patterns more closely approach the first and second light incidence surface 224a and 224b of the light guide plate 224. The reason for forming the printed pattern 225a, 225b and 225c such that each has a different space than another, as described above, is as follows.

First, there is presented an appearance in that the light is generally concentrated not only at the light guide plate 224 that is declined at both ends but also at corner portions of the first and second light incidence surfaces 224a and 224b of the light guide plate 224 in an edge-type LCD device. The light absorbing layers 226b, 226c, 228a, 228b, 227a and 227b are formed at both ends of the optical sheet 226a, the light reflecting plate 228 or the light guide plate 224 to remove the light concentrated at the corners of the first and second light incidence surfaces 224a and 224b, as shown in FIGS. 8, 9 and 11. The printed patterns 225a, 225b and 225c, which are formed on the bottom surface of the light guide plate 224, carry out reflecting the light transmitted toward the bottom surface of the light guide plate 224 to the display unit 210. Accordingly, it is preferred to leak and remove the light, which is concentrated at the corner portions of the first and second light incidence surfaces 224a and 224b and that is positioned out of an activation area of the display unit 210, through the bottom surface of the light guide plate 224. As shown in FIG. 10, therefore, in the area of the first and second light incidence surfaces 224a and 224b of the light guide plate 224, it is preferred that the printed patterns 225b and 225c have a wider space than the printed pattern 225a at the center portion of the light guide plate 224.

Up to now, the description has focused on the case that the lamps for emitting the light are mounted at both ends of the light guide plate 224. In the case that the light incidence surface of the light guide plate 224 is declined, however, the printed patterns on the bottom surface of the light guide plate 224 preferably have different spaces with one other according to the area of the light guide plate 224 even though the lamp is only mounted at an end of the light guide plate 224, as described above. For example, when the first lamp 221a is disposed at an end of the light guide plate 224, the spaces of the printed patterns are gradually narrower in a direction in which the light from the first lamp 221a is transmitted from the first light incidence surface 224a to the declined surface opposite to the first light incidence surface 224b.

As shown in FIG. 11, when the light absorbing layers 227a and 227b are directly formed on the light guide plate 224, it is possible not to form the printed patterns in the area of the first and second light incidence surfaces 224a and 224b of the light guide plate 224. However, the printed pattern 225 is formed in an area of the light guide plate 224 in which the light absorbing layers 227a and 227b are not formed, so as to reflect the light emitted by the first and second lamps 221a and 221b toward the light guide plate 224, as shown in FIG. 11.

Figure 12:
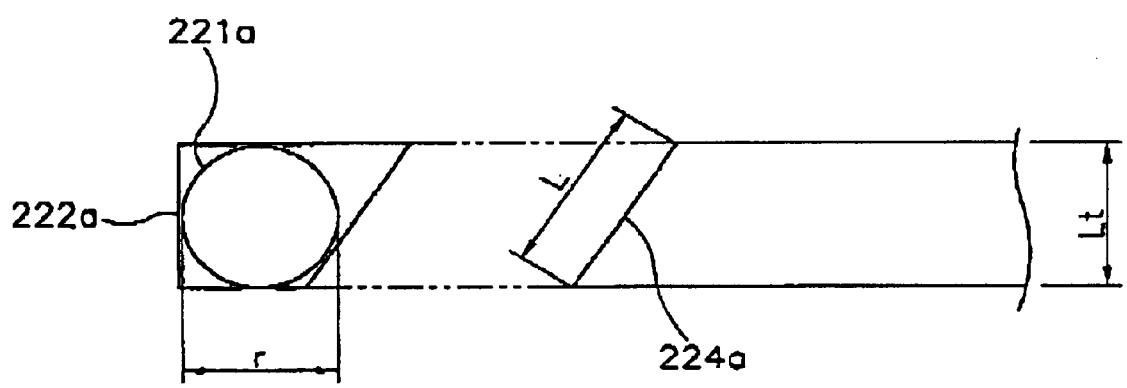
FIGS. 12 and 13 are views showing a light incidence surface of the light guide plate and a length and an installed position of the lamp shown in FIG. 6.
Figure 13:
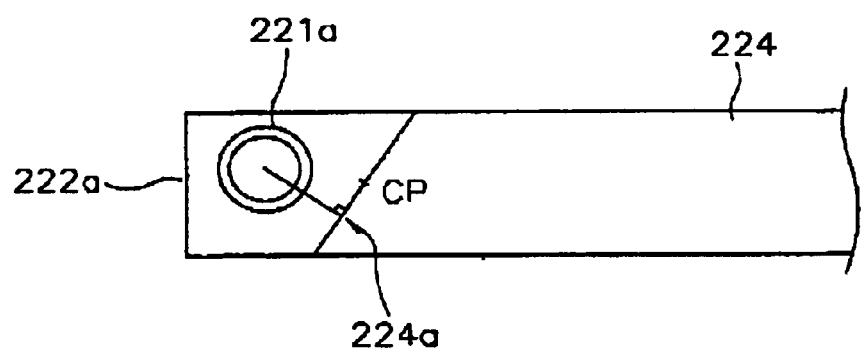

Referring now to FIG. 12, the declined portions of the first and second light incidence surfaces 224a and 224b of the light guide plate 224 are 1.2 to 1.8 times larger in length than an outer diameter of the first and second lamps 221a and 221b. As described above, when the ratio of the length of the declined surface in the first and second light incidence surfaces 224a and 224b to the outer diameter of the first and second lamps 221a and 221b is held to become 1.2 to 1 through 1.8 to 1, with reference to FIG. 13, a line that extends from the center point of the first and second lamps 221a and 221b to be normal to the first and second light incidence surfaces 224a and 224b intersects the first and second light incidence surfaces 224a and 224b beneath the center point ("CP") of the first and second light incidence surfaces 224a and 224b.

On the other hand, continuing with FIG. 12, if the thickness of the light guide plate 224 is more thinner and the inclination of the first and second surfaces 224a and 224b is more sluggish, the ratio of the thickness "Lt" of the light guide plate 224 to the outer diameter "r" of the first and second lamps 221a and 221b substantially can approach 1 to 1.

Though not shown in drawings, a wedge-type light guide plate can be adapted to the LCD device, in which the thickness of the plate is gradually thinner in a direction from a light incidence surface in which the light emitted by the lamp is transmitted to an end opposite to the light incidence surface. While the lamp is generally disposed at an end portion wherein the thickness of the light guide plate is large, such as in the case of the wedge-type light guide plate, at least one lamp is mounted at the end portion. Therefore, as the light incidence surface of the end portion at which the lamp of the light guide plate is disposed is made declined, it is possible to improve the light incidence efficiency. In addition, the light absorbing layer can be formed at one of the light guide plate, the light reflecting plate, which is mounted on the bottom surface of the light guide plate, and the optical sheet, such as a diffusion plate or a prism sheet, which is mounted on the top surface of the light guide plate, as shown in FIGS. 8 to 11. The declined portion in the light incidence surface of the wedge-type light guide plate preferably has about 1.2 to 1.8 times in length than does the outer diameter of the lamp. The thickness from an obtuse apex of the light incidence surface to the bottom surface of the wedge-type light guide plate substantially is the same size as that of the outer diameter of the lamp.

Figure 14:
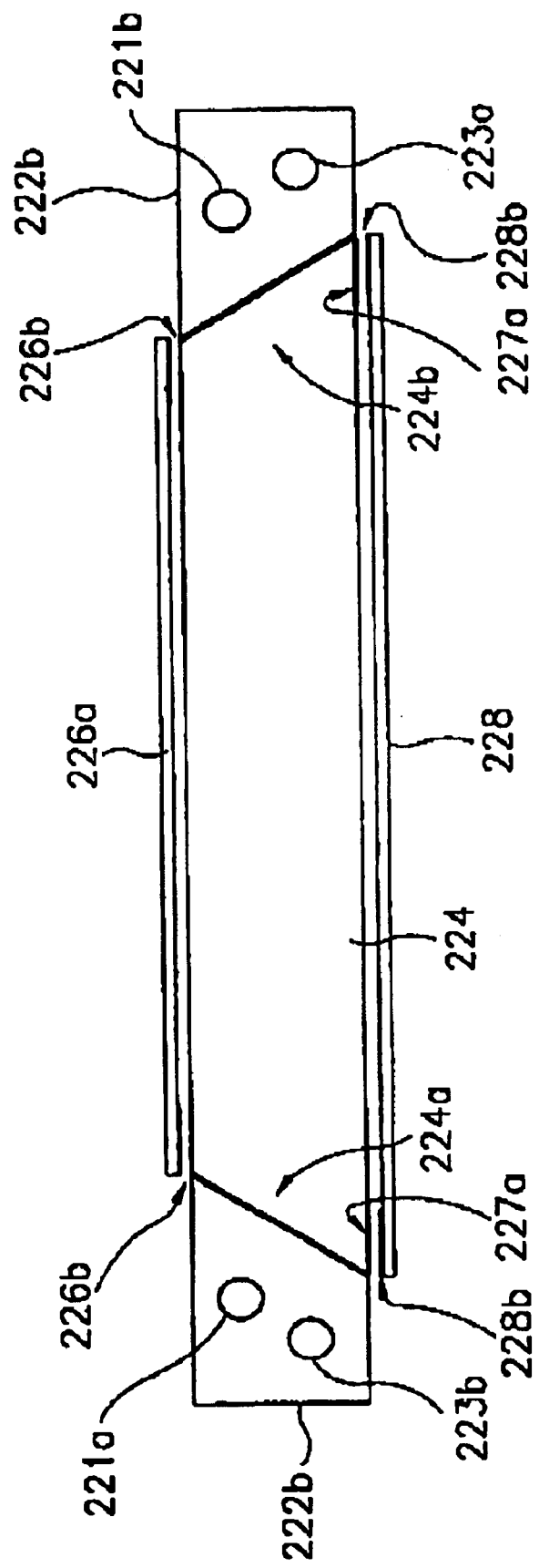
FIG. 14 is a view showing a construction in that plural lamps are adopted to the backlight assembly shown in FIG. 6.

FIG. 14 is a view showing a construction in that plural lamps are adopted to the backlight assembly shown in FIG. 6. Hereinafter, the like reference numerals are adopted to the elements having the same functions as that of the structure element in FIG. 7.

Referring now to FIG. 14, the first and third lamps 221a and 223a, and the second and fourth lamps 221b and 223b are respectively mounted at both ends of the light guide plate 224. The first and second light incidence surfaces 224a and 224b of the light guide plate 224 are declined as shown in FIG. 6. The first and second lamp covers 222a and 222b respectively protecting the first and third lamps 221a and 223a and the second and fourth lamps 221b and 223b have opened surfaces which are declined at the same angle as that of the first and second light incidence surfaces 224a and 224b. In addition, the light absorbing layer can be formed at one of the light guide plate 224, the light reflecting plate 228, which is mounted on the bottom surface of the light guide plate 224, and the optical sheet 226a, such as a diffusion plate or a prism sheet, which is mounted on the top surface of the light guide plate 224, as shown in FIGS. 8 to 11. The declined portion in the first and second light incidence surfaces 224a and 224b of the light guide plate 224 preferably is 1.2 to 1.8 times in length than the outer diameter of the first, second, third and fourth lamps 221a, 221b, 223a and 223b.

Hereinafter, another construction of the lamp unit in the backlight assembly as shown in FIG. 4 will be described.

Figure 15:
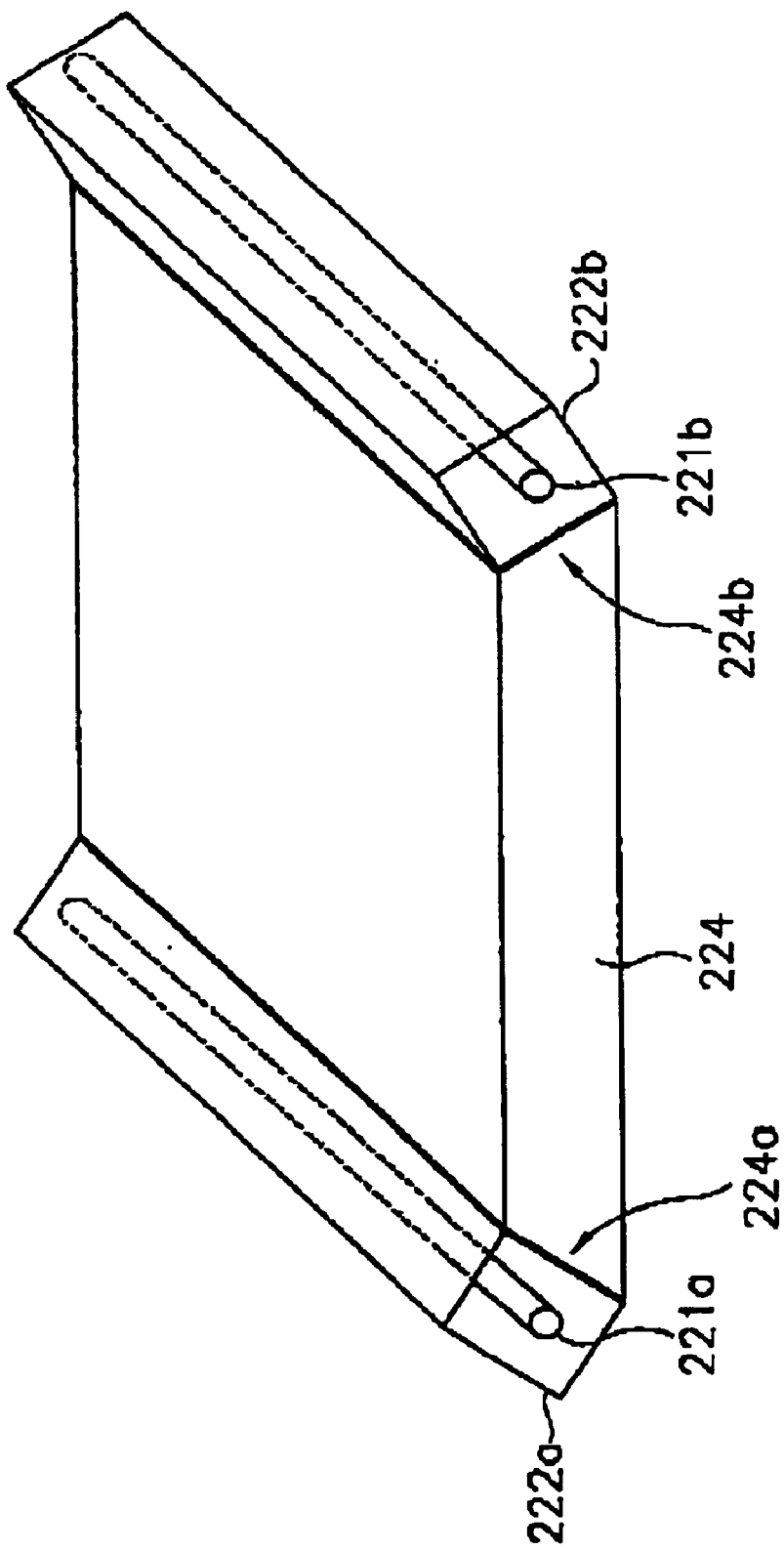
FIGS. 15 and 16 are views showing another construction of the lamp unit and the light guide unit of the backlight assembly shown in FIG. 4.
Figure 16:
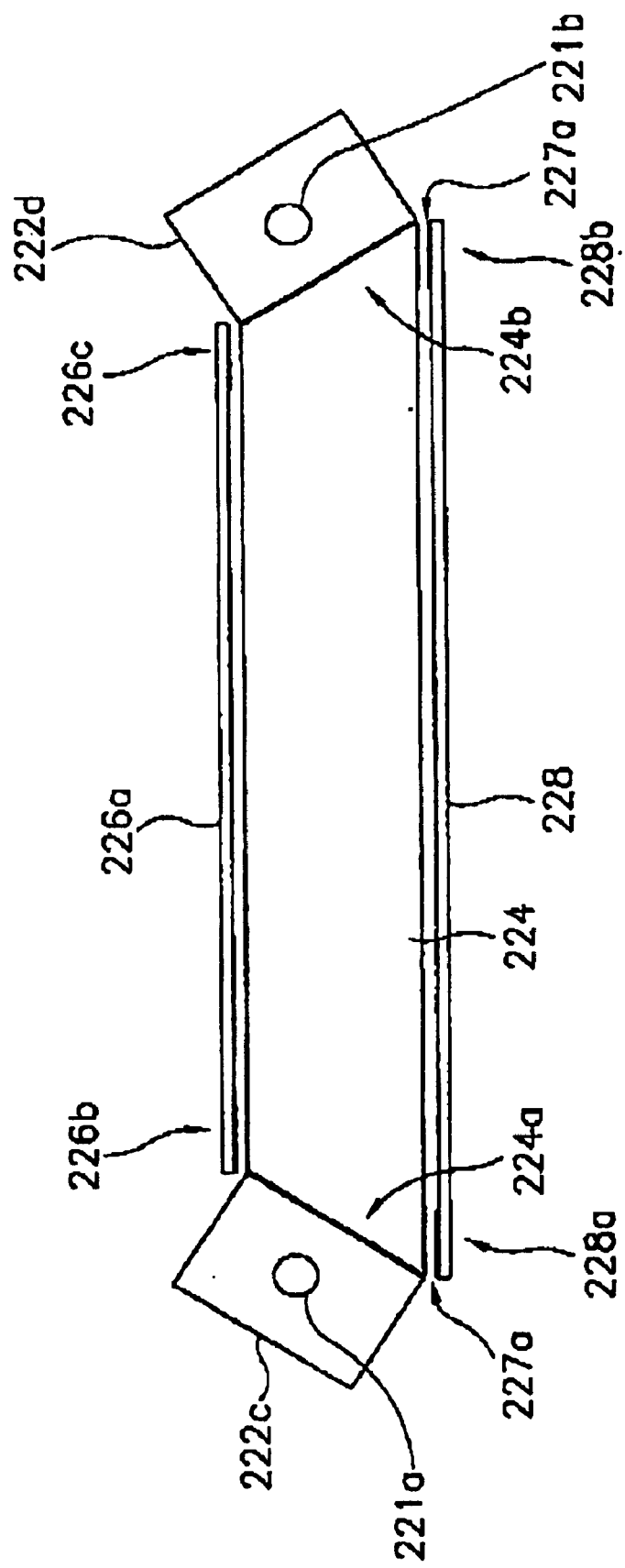
Figure 17:
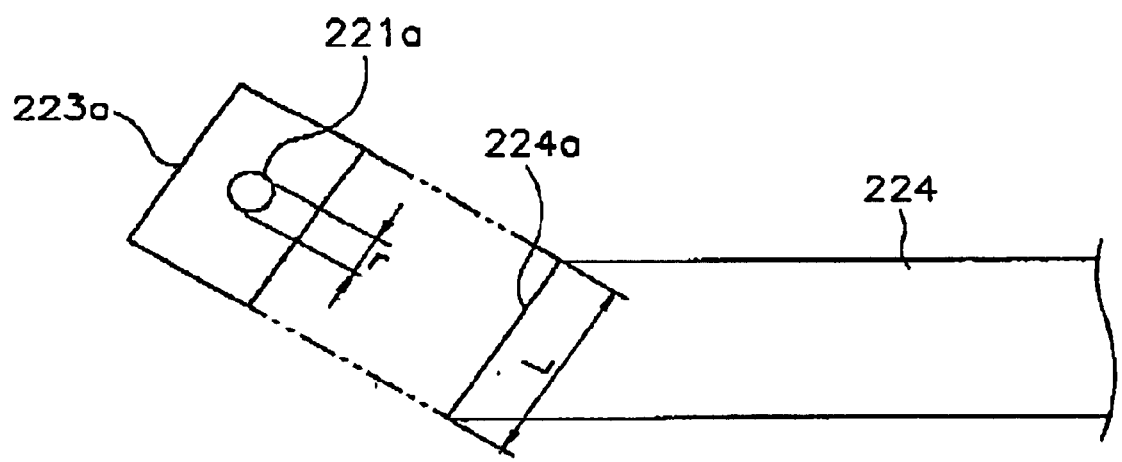
FIG. 17 is a view showing a length of the light incidence surface of the light guide plate and the lamp shown in FIG. 16, respectively.

FIG. 15 is a view showing another construction of the lamp unit and the light guide unit in the backlight assembly shown in FIG. 4, and FIG. 16 is a view showing another construction of the light guide unit in which a diffusion plate and a light reflecting plate are mounted as shown in FIG. 15. FIG. 17 is a view showing each length of a light incidence surface of the light guide plate and the lamp shown in FIG. 15. In FIGS. 15 to 17, the like reference numerals are respectively adapted to the elements having the same construction and function as those of the elements shown in FIGS. 5 to 12.

Referring now to FIGS. 15 and 16, the first and second light incidence surfaces 224a and 224b of the light guide plate 224, in which the light is transmitted, is declined at an obtuse angle with the top surface of the light guide plate 224. In other words, the top surface of the light guide plate 224 is narrower than the bottom surface of the light guide plate 224.

The open surface of the third and fourth lamp covers 222c and 222d, which protect the first and the second lamps 221a and 221b and reflect the light emitted from the first and second lamps 221a and 221b toward the light guide plate 224, are declined to be parallel with the first and second light incidence surfaces 224a and 224b. Furthermore, a light reflecting surface, for reflecting the light emitted from the first and second lamps 221a and 221b toward the light guide plate 224, is formed to be parallel with and opposite to the open surface of the third and fourth lamp covers 223a and 223b.

Referring now to FIG. 16, the light reflecting plate 228 is mounted under the light guide plate 224, and the optical sheet 226a, such as the light diffusing plate or the prism sheet, is disposed on the light guide plate 224. The light absorbing layer is formed in some area of the light reflecting plate 228 and the optical sheet 226a that is adjacent to the first and second light incidence surfaces 224a and 224b of the light guide plate 224 as shown in FIGS. 8 and 9. The descriptions relating to the functions of the light reflecting plate 228 and the optical sheet 226a and the light absorbing layers 228a, 228b, 226b and 226c has been described above with reference to FIGS. 7 to 9.

Meanwhile, the fine printed patterns 225a, 225b and 225c as shown in FIG. 9 are formed on the bottom surface of the light guide plate 224 to increase the reflection efficiency of reflecting the light emitted from the first and second lamps 221a and 221b toward the display unit 210. As shown in FIG. 10, the printed patterns 225a, 225b and 225c are has a higher density according as the printed pattern is located farther away from the light incidence surface of the light guiding means.

If the light absorbing layers 227a and 227b are directly formed on the light guide plate 224, the printed patterns may not be formed in an area of the first and second light incidence surfaces 224a and 224b of the light guide plate 224, as shown in FIG. 11. In the area on which the light absorbing layers 227a and 227b are not formed in the light guide plate 224, the printed pattern 225 is formed to reflect the light emitted from the lamps 221a and 221b toward the light guide plate 224, as shown in FIG. 10.

Referring now to FIG. 17, the declined portions of the first and second light incidence surfaces 224a and 224b of the light guide plate 224 are 1.2 to 1.8 times in length ("L") than the outer diameter "r" of the first and second lamps 221a and 221b. On the other hand, if the thickness of the light guide plate 224 is thinner and the inclination of the first and second surfaces 224a and 224b is more sluggish, the ratio of the thickness "Lt" of the light guide plate 224 to the outer diameter "r" of the first and second lamps 221a and 221b substantially can be about 1 to 1 (see FIG. 12).

Table 1 presents a light incidence efficiency according to the construction of the light incidence surface of the light guide plate.

TABLE 1

| Type | A | B | C |
|---|---|---|---|
| Means of flux (lm/m²) | 4133.11 | 5061.01 | 6010.9 |
| Comparison | 100% | 122.45% | 145.43% |

In Table 1, a type "A" is the light guide plate having the light incidence surface perpendicular to the top and bottom surfaces of the light guide plate. Type "B" is the light guide plate having the light incidence surface that is declined at a preferred angle such that the top surface is narrower in width than the bottom surface and the open surface of a lamp cover is asymmetric to a light reflecting surface opposite to the open surface. Type "C" is the light guide plate having the light incidence surface that is declined at a preferred angle such that the top surface is narrower in width than the bottom surface and the open surface of the lamp cover is parallel with the light reflecting surface opposite to the open surface.

Referring now to Table 1, it can be noted that the light incidence efficiency of the light guide plate is improved up to 22.45% in comparison with the light guide plate of the type "A" when the light incidence surface of the light guide plate is declined in a manner of the type "B." Furthermore, if the open surface of the lamp cover and the light reflecting surface are formed to be symmetric in a manner of the type "C," the light incidence efficiency is improved even more.

FIGS. 18A to 18E are views showing the light guide plates according to the present invention in which the light guide plates having a different structure with respect to each other provide pathways for the light.

Figure 18A:
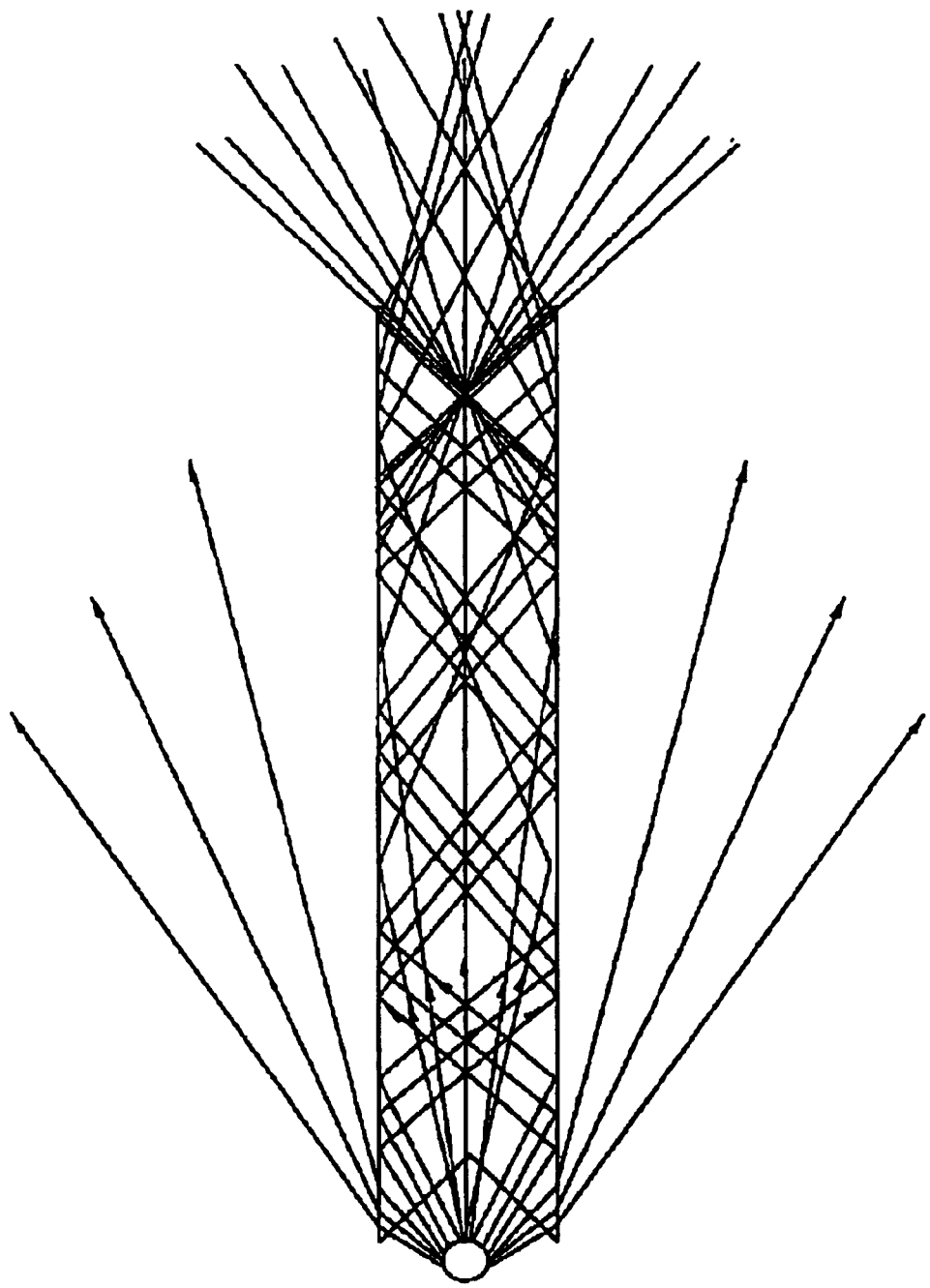
Figure 18C:
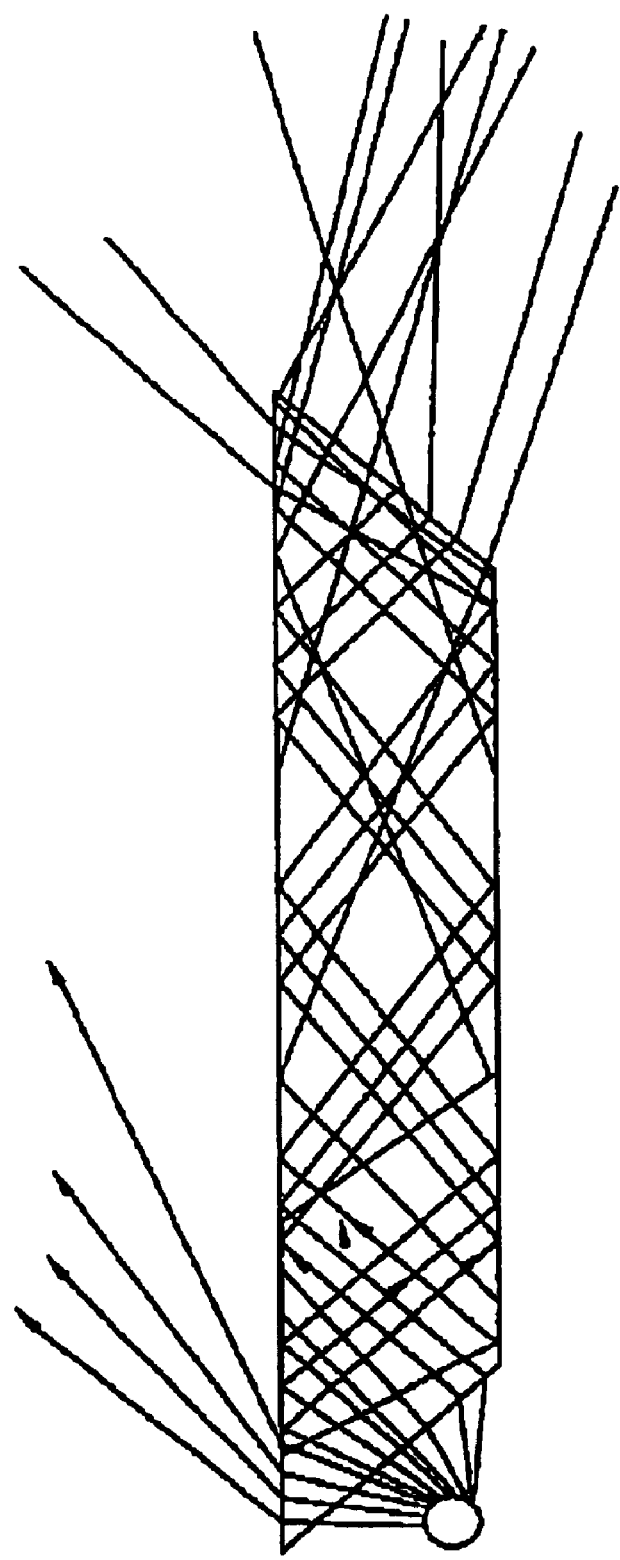
Figure 18D:
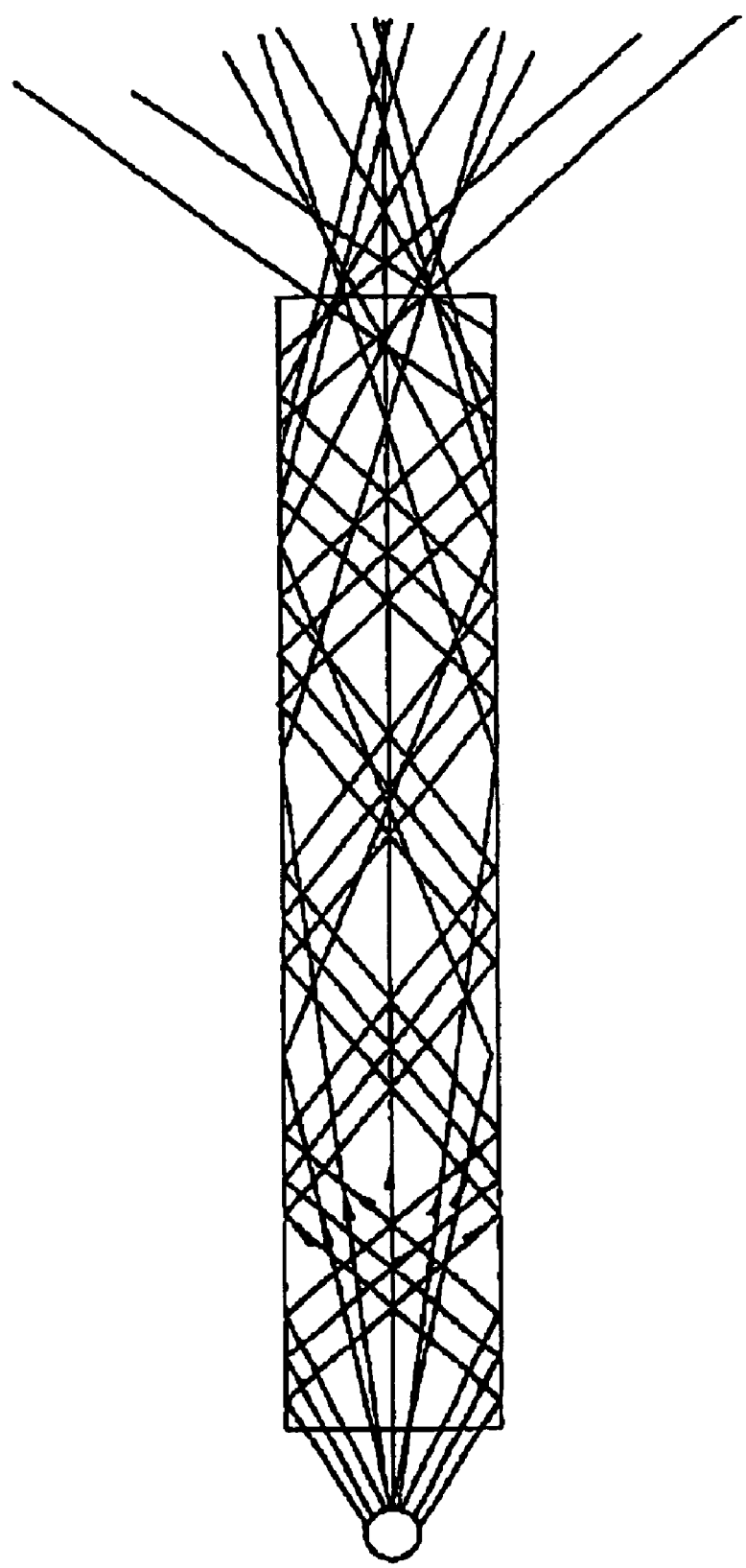
Figure 18E:
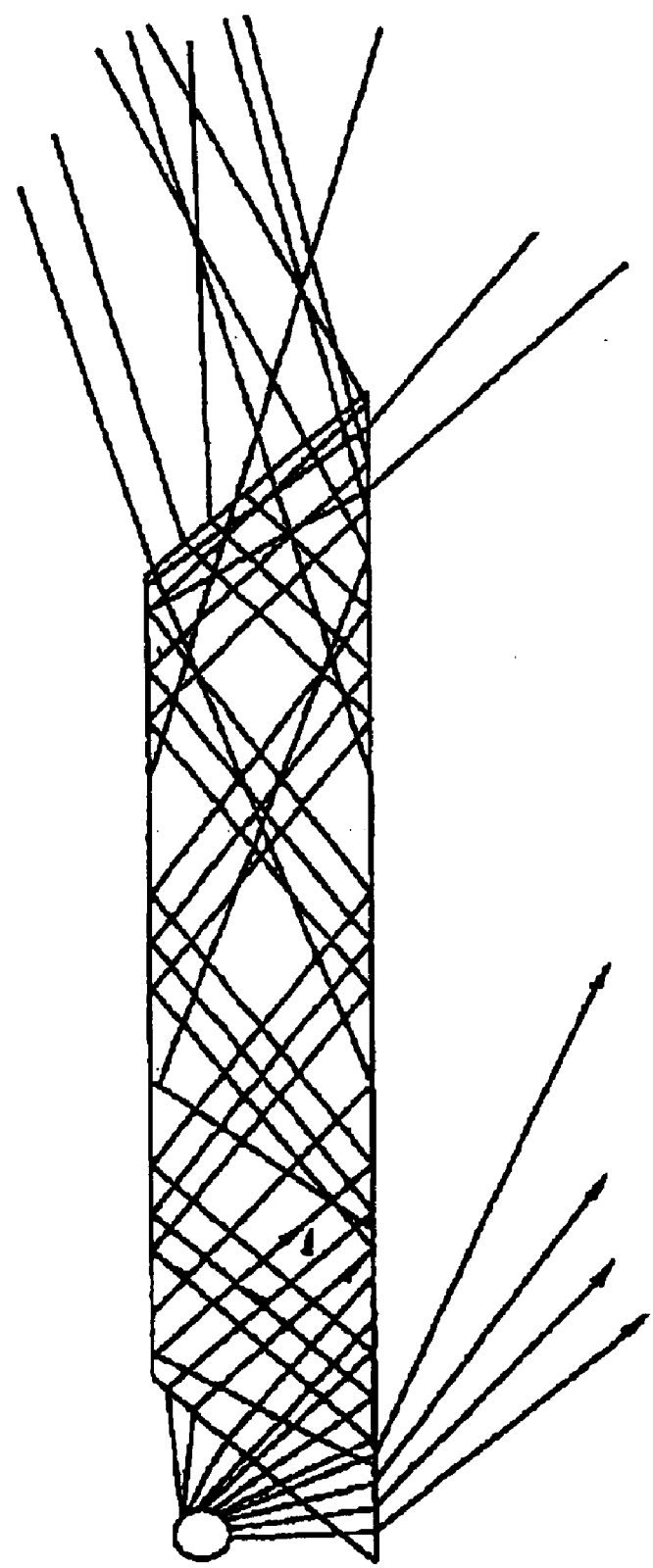

FIGS. 18A and 18B show the light guide plate having a swallow-tail shape at both ends, in which the light incidence surfaces are respectively depressed in a V-shape and a U-shape, respectively. FIG. 18C is the light guide plate in which the top surface is wider than the bottom surface and in which the light incidence surface is declined at a preferred angle. In FIGS. 18A to 18C, the light is leaked or concentrated at the corners of the light incidence surface. FIG. 18D shows the light guide plate having a uniform thickness over the entire width. In that case, however, the light guide plate has lower light incidence efficiency than the light guide plate having the light incidence surface that is declined. FIG. 18E shows the light guide plate according to the present invention in which the light leaked at the corner of the light incidence surface is absorbed by the light absorbing layers that is adhered to the light reflecting plate, thereby resulting in minimizing the concentration of the light.

In the backlight assembly and the LCD device according to the present invention, the top surface of the light guide plate, in which the light from the lamps is emitted, is declined at an obtuse angle with the light incidence surface of the light guide plate in which the light from the lamps is inputted. Accordingly, even though the thickness of the light guide plate is not increased, the incidence efficiency of the light can be improved.

Furthermore, the light reflecting plate is mounted under the bottom surface of the light guide plate and the optical sheet is disposed on the top surface of the light guide plate. In addition, because the light absorbing layer is formed at the ends of the light guide plate, the light reflecting plate and/or the optical sheet acts to absorb the light concentrated at the corner of the light incidence surface.

Therefore, it is possible to remove the light concentrated at the corner of the light incidence surface in the light guide plate efficiently, thereby improving the incidence efficiency of the light from the lamps and the quality of images displayed on the display unit.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A backlight assembly comprising:
    light guiding means for guiding a light provided through a light incidence surface to a display unit in order to display an image, the light incidence surface being formed to make an obtuse angle with a light-emitting surface through which the light is emitted to the display unit; and
    light emitting means for emitting and providing the light through the light incidence surface to the light guiding means, the light emitting means being disposed on the light incidence surface of the light guiding means.

2. A backlight assembly of claim 1, wherein the light emitting means comprises:
    at least one lamp for generating the light; and
    a lamp cover to protect the lamp, the lamp cover being disposed on the light incidence surface of the light guiding means and being open at a side in order to emit the light from the lamp toward the light guiding means, and the open side of the lamp cover being declined at an inclination angle equal to an inclination angle of the light incidence surface.

3. A backlight assembly of claim 2, wherein the open side of the lamp cover is formed to be parallel with a backside opposite to the open side of the lamp cover.

4. A backlight assembly of claim 2, wherein the light incidence surface has 1.2 to 1.8 times a length of an outer diameter of the lamp.

5. A backlight assembly of claim 4, wherein the light guiding means has a thickness as large as the outer diameter of the lamp.

6. A backlight assembly of claim 2, wherein a printed pattern is formed at a bottom surface of the light guiding means to reflect the light from the lamp toward the display unit.

7. A backlight assembly of claim 6, wherein the printed pattern has a higher density according as the printed pattern is located farther away from the light incidence surface of the light guiding means.

8. A backlight assembly of claim 2, wherein a light absorbing layer is formed on a bottom surface of the light guiding means to absorb a part of the light emitted by the lamp.

9. A backlight assembly of claim 8, wherein the light absorbing layer is formed at a portion adjacent to the light incidence surface on the bottom surface of the light guiding means.

10. A backlight assembly of claim 1, further comprising:
light reflecting means for reflecting a light, which leaks from the light guiding means, toward the light guiding means, the light reflecting means being disposed on a bottom surface of the light guiding means; and
an optical sheet for controlling a brightness of the light emitted from the light guiding means, the optical sheet being disposed on a top surface of the light guiding means.

11. A backlight assembly of claim 10, wherein a light absorbing layer is formed on the light reflecting means and on the optical sheet so as to absorb the light that leaks from the light guiding means.

12. A backlight assembly of claim 11, wherein the optical sheet is a diffusion sheet or a prism sheet.

13. A backlight assembly of claim 2, wherein the light guiding means is a wedge-type light guide plate in which a thickness of the plate varies so that the plate gradually becomes thinner according to being closer to an end portion of the light guiding means, the end portion being opposite to the light incidence surface through which the light of the light emitting means is incident.

14. A backlight assembly of claim 13, wherein a length of a shortest distance from an apex of the obtuse corner of the light incidence surface to the bottom surface of the light guiding means is substantially equal to an outer diameter of the lamp.

15. A liquid crystal display device comprising:
a display unit for displaying an image;
a light guiding unit for guiding a light provided through a light incidence surface to the display unit, the light incidence surface being formed to make an obtuse angle with a light-emitting surface through which the light is emitted to the display unit; and
a light emitting unit for emitting and providing the light through the light incidence surface to the light guiding unit, the light emitting unit being mounted on the light incidence surface of the light guiding unit; and
a light reflecting unit for reflecting a light, which leaks from the light guiding unit, toward the display unit, the light reflecting unit being disposed on a bottom surface of the light guiding unit.

16. A liquid crystal display device of claim 15, wherein the light emitting unit comprises:
at least one lamp for emitting the light; and
a lamp cover to protect the lamp, the lamp cover being mounted on the light incidence surface of the light guiding unit with a side thereof being open so that the light emitted from the lamp is emitted through the open side of the lamp cover to the light guiding unit, and the open side of the lamp cover being declined at an inclination angle equal to an inclination angle of the light incidence surface.

17. A liquid crystal display device of claim 16, wherein the open side of the lamp cover is formed to be parallel with a backside opposite to the open side thereof.

18. A liquid crystal display device of claim 17, wherein the light incidence surface has 1.2 to 1.8 times a length of an outer diameter of the lamp.

19. A liquid crystal display device of claim 18, wherein a thickness of the light guiding unit at a position perpendicular to the light-emitting surface thereof is equal to the outer diameter of the lamp.

20. A liquid crystal display device of claim 16, wherein a printed pattern has a higher density according as the printed pattern is located farther away from the light incidence surface of the light guiding means.

21. A liquid crystal display device of claim 20, wherein the printed pattern has a higher density according as the printed pattern is located farther away from the light incidence surface of the light guiding unit.

22. A liquid crystal display device of claim 16, wherein a light absorbing layer is formed on a bottom surface of the light guiding unit to absorb a part of the light emitted by the lamp.

23. A liquid crystal display device of claim 22, wherein the light absorbing layer is formed at a portion adjacent to the light incidence surface on the bottom surface of the light guiding unit.

24. A liquid crystal display device of claim 15, further comprising an optical sheet for diffusing the light emitted from the light guiding unit, the optical sheet being disposed on a top surface of the light guiding unit.

25. A liquid crystal display device of claim 24, wherein a light absorbing layer is formed on the light reflecting unit and on the optical sheet so as to absorb the light that leaks from the light guiding unit.

26. A liquid crystal display device of claim 25, wherein the optical sheet is a diffusion sheet or a prism sheet.

27. A liquid crystal display device of claim 16, wherein the light guiding unit is a wedge-type light guide plate in which a thickness of the plate varies so that the plate gradually becomes thinner according to being closer to an end portion of the light guiding means, the end portion being opposite to the light incidence surface through which the light of the light emitting means is incident.

28. A liquid crystal display device of claim 27, wherein a length of shortest distance from an apex of the obtuse corner of the light incidence surface to the bottom surface of the light guiding unit is substantially equal to an outer diameter of the lamp.

29. The backlight assembly of claim 1, wherein the light incidence surface and the light emitting surface are substantially flat surfaces.

30. A liquid crystal display device comprising:

a display unit that displays an image;

a light guiding unit that guides a light provided through a light incidence surface to the display unit in order to display the image, the light incidence surface being formed to make contact with a light-emitting surface through which the light is emitted to the display unit, the light incidence surface being formed to make an obtuse angle with respect to the light-emitting surface at a position where the light incidence surface directly meets the light-emitting surface;

a light emitting unit that emits and provides the light through the light incidence surface to the light guiding unit, the light emitting unit being disposed on the light incidence surface of the light guiding unit; and a light reflecting unit that reflects light which leaks from the light guiding unit to the display unit, the light reflecting unit being disposed on a bottom surface of the light guiding unit.

31. The backlight assembly of claim 30, wherein the light incidence surface and the light-emitting surface are substantially flat surfaces.

* * * * *